(12) United States Patent
Musharbash

(10) Patent No.: US 8,521,479 B2
(45) Date of Patent: Aug. 27, 2013

(54) AUTOMATIC DESIGN AND SALE OF COMPLEX MULTI-VENDOR ELECTRONIC AND MECHANICAL SYSTEMS

(75) Inventor: Bill N. Musharbash, San Jose, CA (US)

(73) Assignee: Intangi, Inc., San Jose, CA (US)

( * ) Notice: Subject to any disclaimer, the term of this patent is extended or adjusted under 35 U.S.C. 154(b) by 310 days.

(21) Appl. No.: 12/581,102

(22) Filed: Oct. 16, 2009

(65) Prior Publication Data

US 2010/0036776 A1    Feb. 11, 2010

Related U.S. Application Data

(60) Division of application No. 11/504,207, filed on Aug. 14, 2006, now abandoned, which is a continuation of application No. 10/081,933, filed on Feb. 21, 2002, now Pat. No. 7,096,164.

(60) Provisional application No. 60/270,949, filed on Feb. 21, 2001.

(51) Int. Cl.
*G06F 17/50* (2006.01)

(52) U.S. Cl.
USPC .............................................................. 703/1

(58) Field of Classification Search
USPC ................................................................ 703/1
See application file for complete search history.

(56) References Cited

U.S. PATENT DOCUMENTS

| | | | |
|---|---|---|---|
| 5,260,866 A * | 11/1993 | Lisinski et al. | 705/29 |
| 5,500,802 A * | 3/1996 | Morris et al. | 700/182 |
| 5,745,765 A | 4/1998 | Paseman | |
| 6,002,854 A | 12/1999 | Lynch et al. | |
| 6,041,324 A * | 3/2000 | Earl et al. | 1/1 |
| 6,058,262 A | 5/2000 | Kawas et al. | |
| 6,078,891 A * | 6/2000 | Riordan et al. | 705/10 |
| 6,247,128 B1 * | 6/2001 | Fisher et al. | 713/100 |
| 6,279,007 B1 * | 8/2001 | Uppala | 1/1 |
| 6,829,703 B1 * | 12/2004 | Caswell et al. | 713/1 |
| 6,836,766 B1 | 12/2004 | Gilpin et al. | |
| 6,865,524 B1 | 3/2005 | Shah et al. | |
| 7,096,164 B1 | 8/2006 | Musharbash | |

OTHER PUBLICATIONS

Kent Allen et al., "Encyclopedia of Microcomputers", 1993, Marcel Dekker, p. 62.*

(Continued)

*Primary Examiner* — Dwin M Craig
*Assistant Examiner* — Russ Guill
(74) *Attorney, Agent, or Firm* — Nixon Peabody LLP; John P. Schaub

(57) ABSTRACT

The automation of design and sale of electronic and mechanical components is accomplished by allowing a user to design a plan for their electronic and mechanical component needs using specialized software. The software utilizes predefined models of components to aid the user in designing a system where all the components are compatible, even in cases where the components are made by different manufacturers. This is accomplished by creating a model for each proposed piece of equipment in the system, the model having properties and rules, wherein the rules define conditions and actions. Then an object is created for each piece of equipment in the system. Selections for values for the properties are received for each of the pieces of equipment. Any rules that have as a condition the properties for which value selections are received are executed. Finally, testing may be undertaken to determine if a proposed configuration is valid by examining results of the rule execution.

6 Claims, 35 Drawing Sheets

(56) References Cited

OTHER PUBLICATIONS

"ECIX Quick Reference Data for Compliance Level 1 QRD CL1", 1999, Silicon Integration Initiative, pp. 1-21.*

Les Galloway et al., "Operations Management in Context", 2000, Butterworth-Heinemann, p. 247.*

Ranjan Bailur Kini, "Integrating hierarchically significant part numbers to bill of materials processing", 1985, Texas Tech University, pp. 1-119.*

Theodore S. Geiger et al., "Automated design-to-cost: integrating costing into the design decision," 1996, Computer-Aided Design, vol. 28, No. 6/7, pp. 423-438.*

Richard C. Dorf et al., "Handbook of Design, Manufacturing and Automation," 1994, John Wiley & Sons, pp. 438-441, 459.*

Nexpert Object Fundamentals, 1988, Neuron Data, Chapter 11, pp. 1-2.

Hedin et al., "Product Configuration Using Object Oriented Grammers," B. Magnusson (Ed.): ECOOP 98, SCM-8, LNCS 1439, 1998, pp. 107-126.

Nexpert Object Fundamentals, 1988, Neuron Data, Chapter 1, pp. 10, 20, 21; Chapter 4, p. 49; Chapter 8, pp. 4 and 43; Chapter 9, pp. 34-36; and Chapter 10, p. 7.

Ernest J. Friedman-Hill, "Jess, The Java Expert System Shell," 1998, Sandia National Laboratories, pp. 1-73.

Litman et al., "R++; Adding Path-Based Rules to C++," Transactions on Knowledge and Data Engineering, May/Jun. 2002, IEEE, vol. 14, No. 3, pp. 638-658.

MetraByte Product Catalog, Summer 1987.

Nexpert Object Fundamentals, 1988, Neuron Data Inc., Chapter 8—Rules, pp. 1-18; pp. 34-38; and pp. 47-48.

Apte, C. et al., "AI at IBM Research," IEEE Intelligent Systems and Their Applications, Nov.-Dec. 2000, vol. 15, Issue 5, pp. 51-57.

Coyne, J.P., "The Desirability of Embedding an Expert System Shell Within a Relational DBMS," Proceedings of the International Conference on Developing and Managing Expert System Programs, 1991, pp. 12-14.

Office Action in U.S. Appl. No. 11/504,207, mailed Mar. 19, 2007.
Office Action in U.S. Appl. No. 11/504,207, mailed Oct. 10, 2007.
Office Action in U.S. Appl. No. 11/504,207, mailed Oct. 20, 2008.
Office Action in U.S. Appl. No. 11/504,207, mailed Apr. 17, 2009.
Office Action in U.S. Appl. No. 10/081,933, mailed Aug. 9, 2005.

\* cited by examiner

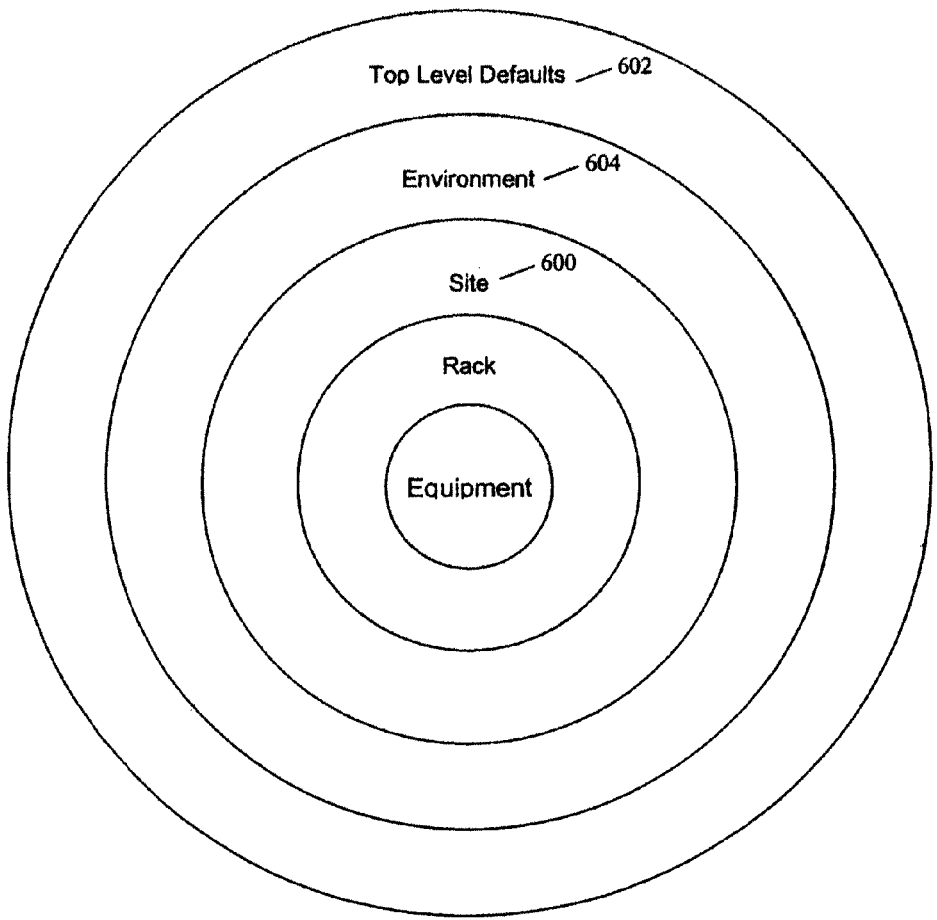

FIG. 6

Notes:
- Top Level Defaults -
    These defaults are user settings that specify how the system will function and initial or default configuration settings.

- Environment -
    The environment, in which an equipment object lives, encompasses all information available within a system and includes data made available through the integration of $3^{rd}$ party applications.

- Container -
    Containers are objects that host other objects. For example, the site object hosts the rack and the rack host the equipment (when the equipment is racked, otherwise the site hosts the equipment).

| Rule ID | Fragment ID | Product | Port | Cable ID | Self Connect |
|---------|-------------|---------|------|----------|--------------|
| 2 | 1 | A | 1 | 60 | 1 |
| 2 | 2 | A | 2 | 60 | 1 |
| 2 | 3 | B | 3 | 60 | 0 |

| Rule ID | Fragment ID | Product | Port | Cable ID | Self Connect |
|---|---|---|---|---|---|
| 3 | 1 | A | 1 | 75 | 0 |
| 3 | 2 | B | 1 | 75 | 0 |
| 3 | 3 | C | 1 | 75 | 0 |

| Rule ID | Fragment ID | Product | Port | Cable ID | Self Connect |
|---|---|---|---|---|---|
| 4 | 1 | A | 1 | 90 | 0 |
| 4 | 2 | A | 1 | 90 | 0 |

Product A

| Rule ID | Fragment ID | Product | Port | Cable ID | Self Connect |
|---------|-------------|---------|------|----------|--------------|
| 5 | 1 | A | 1 | 95 | 1 |
| 5 | 2 | A | 2 | 95 | 1 |

| Rule ID | Fragment ID | Product | Port | Cable ID | Self Connect |
|---|---|---|---|---|---|
| 6 | 1 | A | 1 | 80 | 1 |
| 6 | 2 | A | 2 | 80 | 1 |
| 6 | 3 | B | 1 | 80 | 0 |
| 6 | 4 | C | 1 | 80 | 0 |

US 8,521,479 B2

AUTOMATIC DESIGN AND SALE OF COMPLEX MULTI-VENDOR ELECTRONIC AND MECHANICAL SYSTEMS

CROSS-REFERENCE TO RELATED APPLICATION

This application is a divisional of co-pending U.S. application Ser. No. 11/504,207, filed Aug. 14, 2006 which is a continuation of U.S. application Ser. No. 10/081,933, filed Feb. 21, 2002 which claims priority based on Provisional Application Ser. No. 60/270,949, filed Feb. 21, 2001, by Bill N. Musharbash, entitled "Automatic Design and Sale of Complex Multi-Vendor Electronic and Mechanical Systems" each of which is incorporated herein by reference in its entirety.

FIELD OF THE INVENTION

The present invention relates to electronic systems sales. More specifically, the present invention relates to the automatic design and sale of complex multi-vendor electronic and mechanical systems.

BACKGROUND OF THE INVENTION

Customers who wish to set up electronic and/or mechanical systems, such as computer networks, in their homes or offices generally have to figure out on their own what components they need to purchase. This may involve visiting several vendor and/or manufacturer web sites or locations, each of whom have a tendency to push their own products. Additionally, product literature is often limited in nature, describing only how to interface a given product with another product in the manufacturer's line. Customers who wish to mix-and-match components from various manufacturers may be left to their own devices. Additionally, users may be unfamiliar with newer products. What is needed is a solution that allows customers to automatically determine their component needs and facilitates sales of those components.

BRIEF DESCRIPTION OF THE INVENTION

The automation of design and sale of electronic and mechanical components is accomplished by allowing a user to design a plan for their electronic and mechanical component needs using specialized software. The software utilizes predefined models of components to aid the user in designing a system where all the components are compatible, even in cases where the components are made by different manufacturers. This is accomplished by creating a model for each proposed piece of equipment in the system, the model having properties and rules, wherein the rules define conditions and actions. Then an object is created for each piece of equipment in the system. Selections for values for the properties are received for each of the pieces of equipment. Any rules that have as a condition the properties for which value selections are received are executed. Finally, testing may be undertaken to determine if a proposed configuration is valid by examining results of the rule execution.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 6 is a diagram illustrating an inheritance hierarchy in accordance with a specific embodiment of the present invention.

DETAILED DESCRIPTION

Embodiments of the present invention are described herein in the context of a system of computer, servers, communication mechanism, and tags. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines.

I. Overview

In a specific embodiment of the present invention, software is utilized for the automation of the design and sale of complex electronic and mechanical multi-vendor systems. The software may support the detailed configuration of equipment and interconnection of these equipments into a system. The software may then support the design and sales of systems located at one site or many sites. The software also provides a multi-node configuration mechanism that allows for the quick configuration of equipment throughout the system. The software may also serve as the foundation for a website that will offer the design and integration capabilities to online users.

Figure 1:
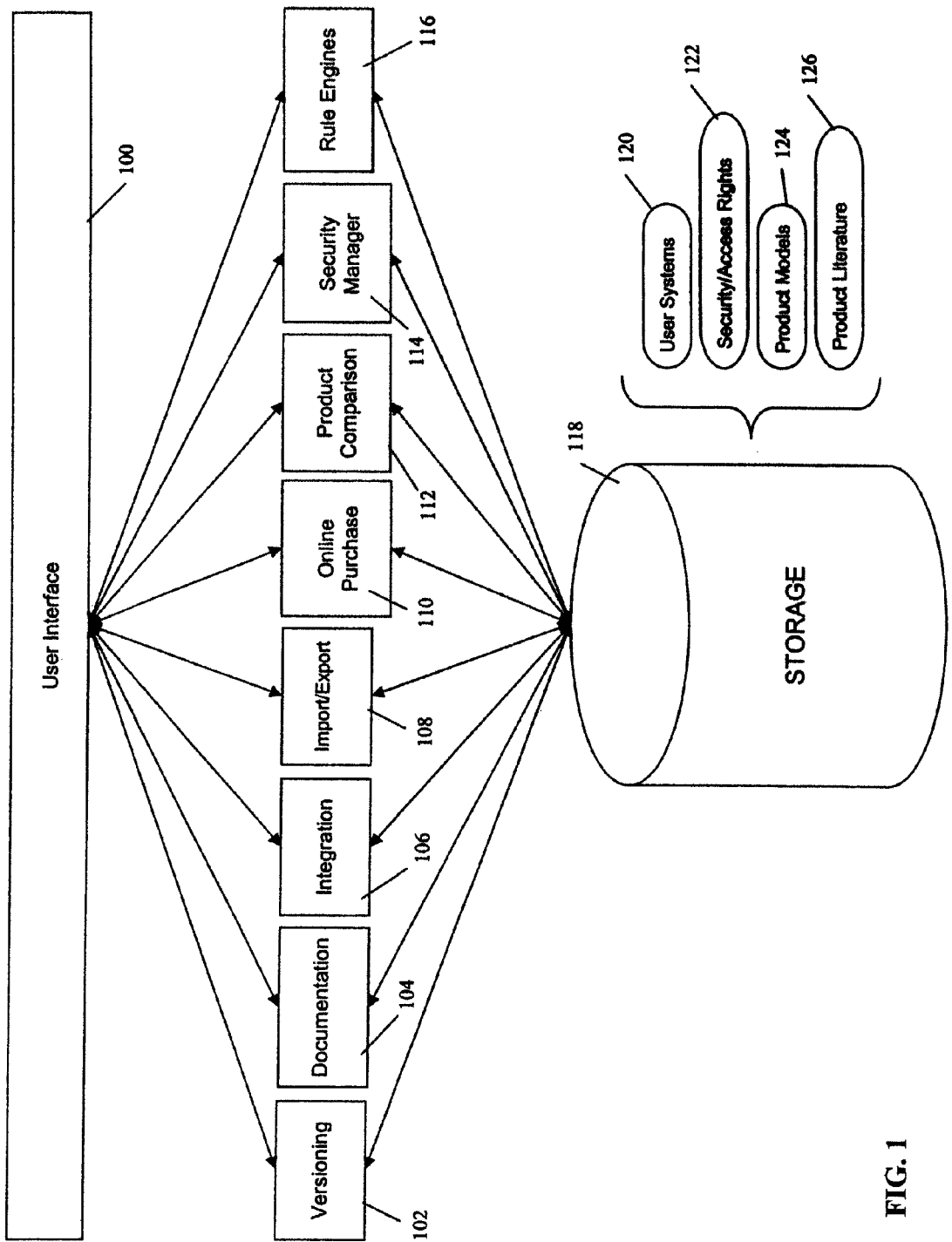
FIG. 1 is a block diagram illustrating the overall structure of software in accordance with a specific embodiment of the present invention.

FIG. 1 is a block diagram illustrating the overall structure of software in accordance with a specific embodiment of the present invention. A user interface 100 may provide a link between the user and individual modules. The modules include a versioning module 102, documentation module 104, integration module 106, import/export module 108, online purchase module 110, product comparison module 112, security manager module 114, and rule engines module 116. All the modules may be linked to a storage device 118, such as a database. The database may store such items as user systems 120, security/access rights 122, product models 124, and product literature 126.

II. Models

Before the software depicted in FIG. 1 can be utilized for individual users, the products, cables, user systems, etc. that the users can select from must first be modeled. In a specific embodiment of the present invention, these models are implemented in both a relational database and in Extensible Markup Language (XML). One of ordinary skill in the art will recognize that XML is only an example of an extensible markup language, and to the extent there are multiple extensible markup languages other may be used. Both implementations may be based on the model diagrams and description described in this application. However, one of ordinary skill in the art will recognize that the model diagrams and descriptions may be modified over time to account for changes in product makeup and new advances in technology.

The XML format provides an ideal backbone for the portability and sharing of these models between different systems and users. The XML format enables manufacturers to model their products and to make these models accessible through various means, including the Internet.

A. Product Models

Figure 2:
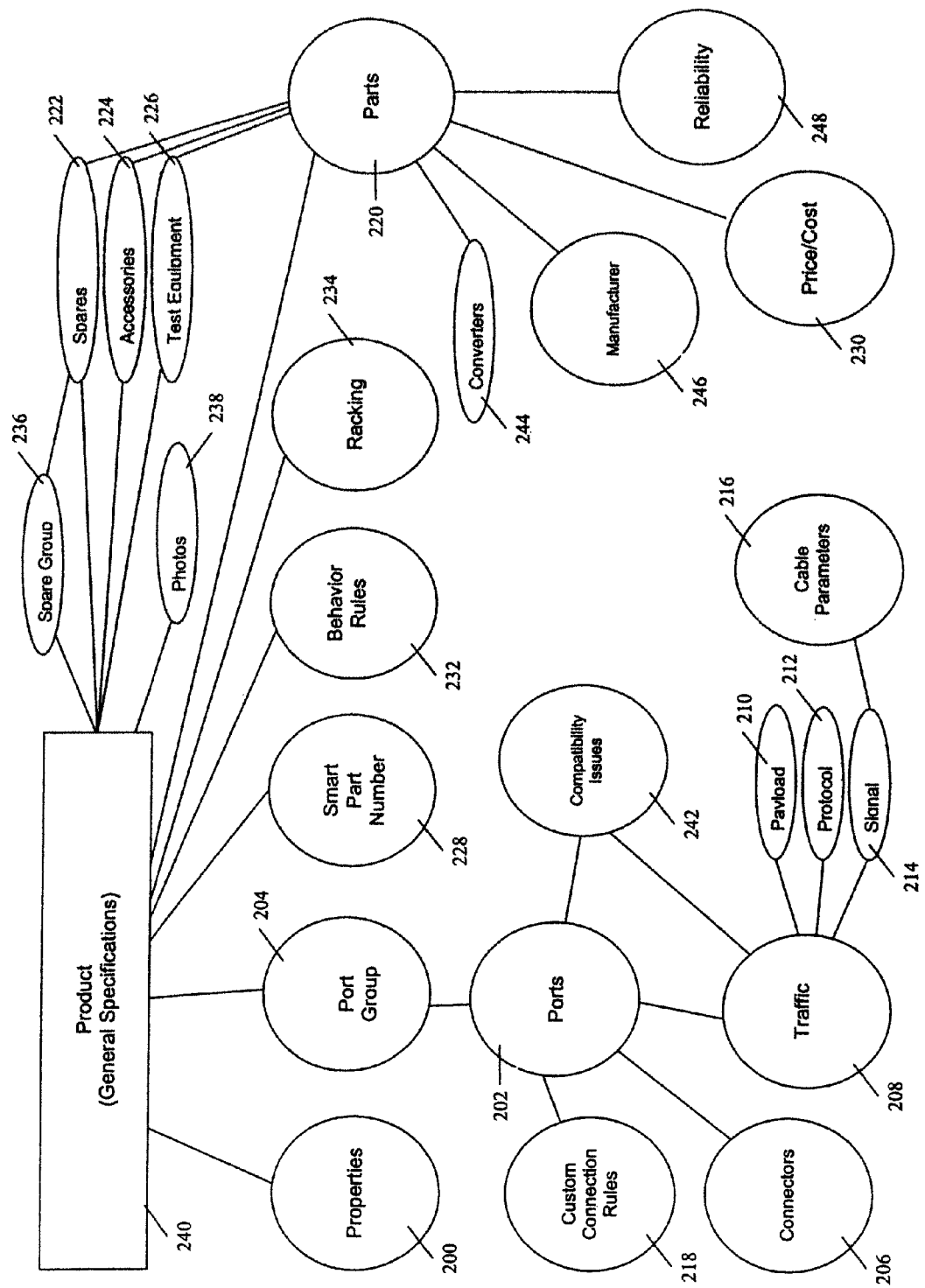
FIG. 2 is a diagram illustrating a methodology to describe a product in terms of its function, behavior, connectivity, and makeup in accordance with a specific embodiment of the present invention.

A product is an equipment-based piece of hardware or software that may be configurable. The term "equipment-based" may include electrical or mechanical devices or components. FIG. 2 is a diagram illustrating a methodology to describe a product in terms of its function, behavior, connectivity, and makeup in accordance with a specific embodiment of the present invention. A key element in modeling a product is a provision for properties 200. A property is an aspect, attribute, feature or configuration point of a product. Properties convey/display the current configuration of a product. Properties allow the user to edit/modify the respective product configuration. Properties allow for the specification and customization of the product's configuration. Properties may also be fundamental to other critical product functionality.

Some of these functions are 1) the changing of an object's behavior based on property modifications, 2) the changing of properties based on object manipulation and 3) the determination of parts, quantities and price/cost for components required in a system design.

The product models also provide a way to define the product's ports. Ports provide a way for products to connect to each other. The ports 202 may be organized into port groups 204. In a specific embodiment of the present invention, ports are modeled in functional rather than physical terms—therefore one "virtual" duplex port can model two simplex ports. Ports may be modeled as an interface having one to many connectors or pins 206 and one to many traffic types 208. A traffic type may be defined as a combination of payload 210, protocol 212 and signal 214 (with signal cabling parameters 216). Traffic types are critical to determining when connections between objects are valid. The determination of valid product connectivity is governed by both custom (pre-written) connection rules 218 and a dynamic, on-the-fly validation mechanism. Another mechanism may also provide for the grouping of ports together into functional blocks when this association is beneficial to enhance the product model.

Products may be modeled based on the concept that a product is an object having one to many parts 220. Because products may have multiple parts that may be dependent on the product's configuration, part inclusion, product sparing 222, accessory 224 and test equipment rules 226 are provided in these models to govern these aspects. The models may also provide support for products that utilize "smart" part numbers 228. Smart part numbers provide or embed configuration information within the part number itself.

The product models may also provide a mechanism to capture the product's price and cost data 230. This pricing and costing mechanism may also extend to smart part numbers where pricing and costing may be linear or non-linear with respect to the configuration.

The product's representation, behavior 232 and racking 234 may also be modeled. Racking is the placement or positioning of a product on a rack or in a cabinet or other container usually based on some guidelines. These concepts as well as connectivity, smart part numbers, sparing and others are discussed in more detail later in this application.

B. Cable Models

Figure 3:
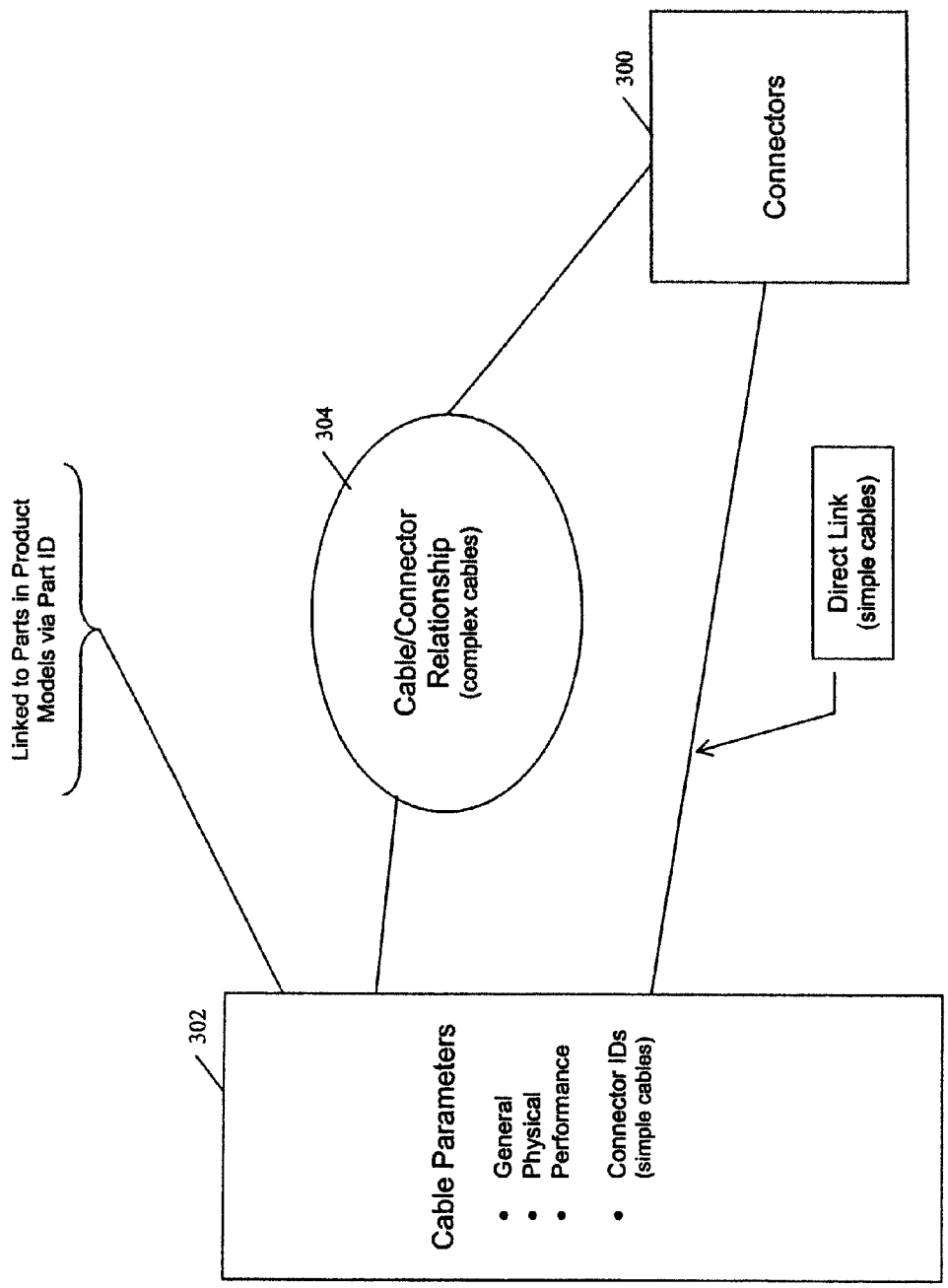
FIG. 3 is a diagram illustrating the cable model in accordance with a specific embodiment of the present invention.

Cables are connection media that typically comprise a wire and two connectors. The cable model is a methodology used to describe not only typical cables but also complex cables consisting of multiple wires and multiple connectors in spider (many-to-many) or daisy chain configurations. FIG. 3 is a diagram illustrating the cable model in accordance with a specific embodiment of the present invention. The cable model may comprise connector 300 and cable 302 specifications as well as a cable to connector association 304. The cable specification may contain the following types of information.

Cable ID—a unique identifier for each cable.
Connector IDs 300—identifiers (2) of the connectors at each end of the cable. These IDs are only used for simple cables (single cable with one connector each) and are set to 0 when complex cables are modeled.
Part ID—fundamentally a cable is defined as a part, through this linkage the cable's part number, description, price/cost and manufacturer are determined.
Type ID—an identifier of the cable's type. Type ID defines a cable as twisted-pair, coax, fiber optic etc.
Label—a short text label associated with the entire cable including the connectors
Layout—a code that defines the layout or configuration of the cable. The layout may be standard cable, 1-to-2 "Y" cable, 1-to-N "Y" cable, M-to-N spider, daisy chain etc.

Physical Characteristics
Length
Diameter
Shielding—specifies whether the cable is shielded and the type of shielding, either per wire and/or overall.
Line Type—defines whether the type of line i.e. solid, stranded etc.
Number of Lines—specifies the number of lines, conductors or strands in the cable.
Pinning Code—defines how the connectors are wired. Examples of pinning codes are straight-thru, cross, EIA/TIA T568A and B and USOC.
Wired Pins—a text string that encodes the pins wired between the connectors. An example of this encoding is "1-8,12,15,20-25" where pins 1 through 8, 12 . . . are wired through the connectors.

Performance Specifications
Attenuation
Impedance
Capacitance
Return Loss
Delay

Each connector may then be further defined with the following attributes.

Connector ID—a unique identifier for each connector
Type—an identifier of the connector's type. Examples of connector types are data communications, power, waveguide, coaxial etc.
Label—a short text label associated with the connector
Gender—a code specifying the connector as male, female or unisex.

Complex cables are associated with connectors through a Cable Connector relationship. This relationship specifies the following information.

Cable ID—The ID of the associated cable
Connector ID—The ID of the associated connector
Location—A code that identifies the location of the connector along the cable two-ended cables have locations 1 and 2, daisy chain cables would have more locations defined. For example a 3-point daisy chain cable would have three locations where 1 is one endpoint, 2 is the middle and 3 is the other endpoint.
Sequence—A code that identifies the connector's sequence at the specified location. This code is used to specify multiple connectors at a location or endpoint as in the case of "Y" or spider cables.

C. User System Models

Figure 4:
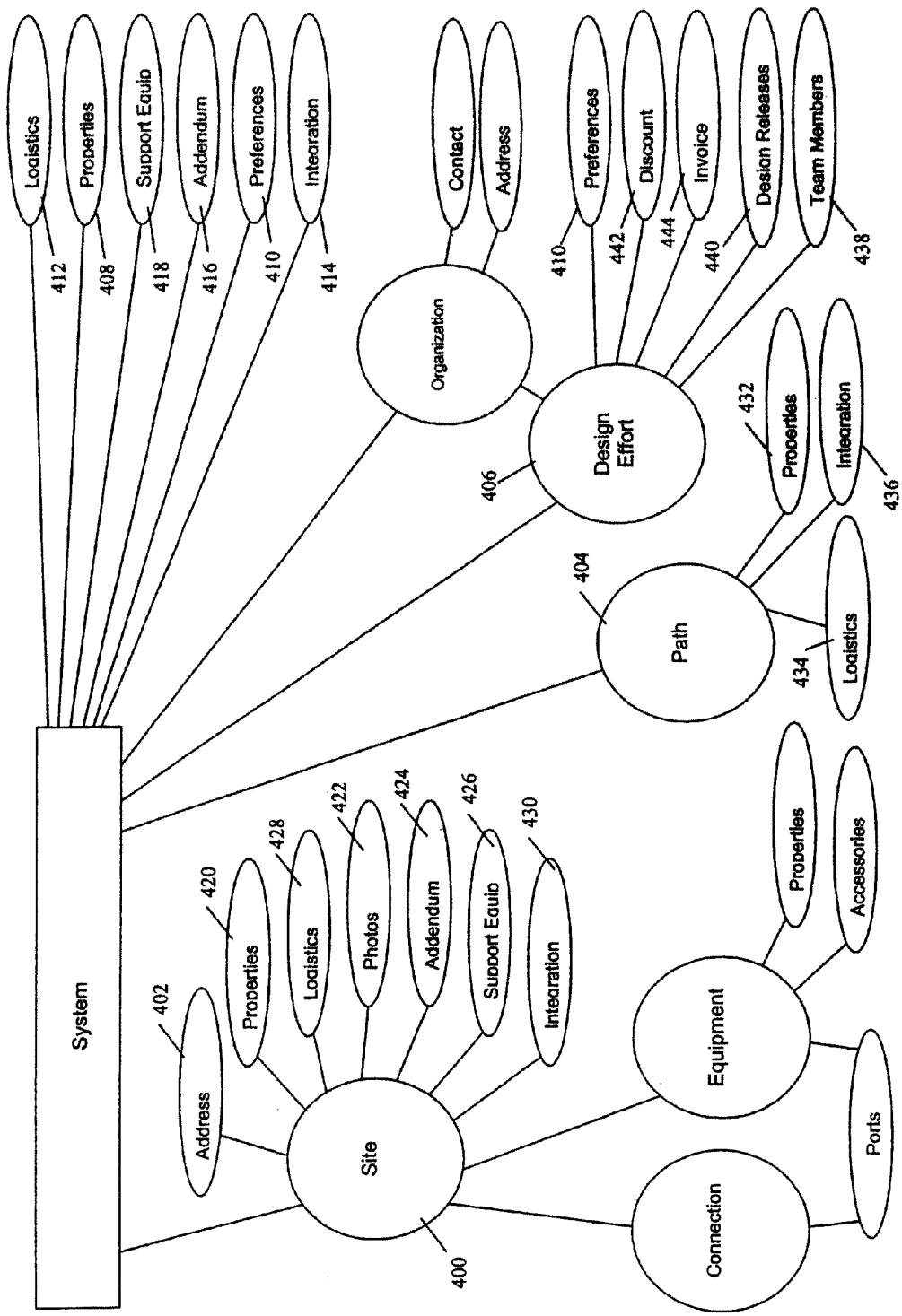
FIG. 4 is a diagram illustrating the user system model in accordance with a specific embodiment of the present invention.

A user system is a collection of sites, equipment and connections along with configuration data and any other data that as a collection compose or contain all of the details of a user's network or subnetwork. User systems may be fundamentally modeled as a collection of sites. FIG. 4 is a diagram illustrating the user system model in accordance with a specific embodiment of the present invention. Sites 400 are locations where equipment is grouped together, typically a location such as a building with an address 402, as would be the case of a node in a Wide Area Network (WAN). Systems also contain a collection of paths 404 that link these sites together. Paths represent WAN connectivity such as leased line, satellite, microwave or Internet. A system may also contain a collection of design efforts 406. A design effort is an individual design task, as in the case of a pre-sale proposal a purchase order or a change order, where the end product is usually a detailed parts list with the associated price and cost data.

Systems may have the following associated information.
        General—general information about the system
        Properties 408—a collection of properties associated with the system
        Preferences 410—user preferences and settings associated with the system
        Logistics 412—system deployment and commissioning data
        Integration 414—data used for the integration of $3^{rd}$ party tools
        Addendum 416—miscellaneous user specified parts associated the system rather than an individual site
        Support Equipment 418—spares and test equipment associated the system rather than an individual site
        Owner—the owner of the system, owner data is detailed in "organization"

Sites contain collections of equipment and connections. Each equipment item has associated with it a collection of ports and properties as defined by the equipment's product model. These instanced collections may contain additional parameters regarding the product's utilization within the user site and system. An equipment item also has an associated set of user-selected accessories. A site also has the following associated information.

General—general information about the site
    Properties 420—a collection of properties associated with the site
    Address 402—the site's address
    Photos 422—photographs or images of site
    Addendum 424—miscellaneous user specified parts associated with the site
    Support Equipment 426—spares and test equipment associated with the site
    Logistics 428—site deployment and commissioning data
    Integration 430—data used for the integration of $3^{rd}$ party tools Paths, which link sites together, may have the following associated information.

General—general information about the path (includes identifiers of the sites linked by the path)
    Properties 432—a collection of properties associated with the path
    Logistics 434—path deployment and commissioning data
    Integration 436—data used for the integration of $3^{rd}$ party tools Design efforts may have the following associated information.

General—general information about the effort including the effort type (proposal, purchase order or change order)
    Preferences 410—user preferences and settings associated with the effort
    Team Members 438—the list of users (and rolls) associated with this effort
    Design Releases 440—a detailed, chronological catalog of output generation events (quotation releases) associated with this effort
    Discount 442—maintains the user specified discounts that apply to this design effort
        Invoice 444—a detailed and chronological catalog of invoices issued against this effort
    Customer—the customer associated with this effort, customer data is detailed in "organization"

III. Rules Processing Engine

In a specific embodiment of the present invention, rules are utilized to determine product compatibility and other attributes. Most rules may be encoded into character strings comprised of the following:

| | |
|---|---|
| Tokens | $PROP23$, $PROP65.OPT4$, etc. |
| Logic | <, <=, >, >=, =, !=, &, |, etc. |
| Math | +, −, *, /, ^, etc. |
| Literals | "ACME", "blue", etc. |
| Values | 15, 31.25, etc. |
| Action codes | $LOCK$, $HIDE$, $DISABLE$, etc. |
| Special operators | ~ |
| Structure | (, ), ;, ., $ |

These character strings are only examples and one of ordinary skill in the art will recognize that these may be modified or replaced with other strings or tokens. Rules are typically coded in two parts, a condition statement and an effect statement. The condition statement is evaluated first and if the condition evaluates to >0 or to a logical TRUE then the effect is executed. The process of evaluating the condition begins by first replacing the variable tokens with their appropriate values. The resulting character string is then evaluated and the result is tested to see if it is greater than zero or a logical TRUE.

Some rules only encode the effect portion. For these rules, the presence of the effect component implies a condition of TRUE.

A. Hierarchy

Each token in a rule may be encoded in a hierarchical syntax where each level is delimited by a "." In a specific embodiment of the present invention, all tokens must begin and end with the "$" delimiter. The hierarchy levels are listed below in descending order.

Object—includes system, site, path, rack and equipment (EQUIP)
    Attribute Level—includes properties (PROP), user defined properties (CUST), environment variables, and other defined parameters
    Sub-Attribute Level—includes option (OPT) and configuration point (CP)
    Qualifier Level—includes qualifiers such as Code (C), Value (V) and Default (DEF)

This hierarchy and some key chaining sequences are shown in the table below.

| Object | Attribute | Sub-Attribute | Qualifier |
|---|---|---|---|
| SYSTEM | ENVnnn | | C, V |
| | CUSTnnn | | C, V |
| SITEnnn | ENVnnn | | C, V |
| | CUSTnnn | | C, V |
| PATHnnn | ENVnnn | | C, V |
| | CUSTnnn | | C, V |
| EQUIPnnn | PROPnnn | OPTnnn | C, V, DEF |
| | PORTnnn | | |
| | TRAFFICnnn | | |
| | PN | CPnnn | C, V, DEF |

-continued

| Object | Attribute | Sub-Attribute | Qualifier |
|---|---|---|---|
| | BUFFTOP | | DEF |
| | BUFFBOT | | DEF |
| | LABEL | | DEF |
| | RACKING | | |
| | RACKPOSV | | |
| | RACKPOSH | | |
| RACKnnn | ENVnnn | | C, V |
| | PROPnnn | OPTnnn | C, V, DEF |

The full syntax for encoding tokens is shown below.

$ objectnnn.attributennn.sub-attributennn.qualifier$

The nnn appended to the object, attribute and sub-attribute levels is an optional number that provides an absolute identification for each item. When that absolute number is not provided, the item implicitly defaults to the object being acted upon or that object's container. The higher levels in the hierarchy are also optional with the same implicit behavior described above. For example, the following tokens are acceptable with the explanation given.

| | |
|---|---|
| $SITE.ENV4$ | When used in an environment rule for a specific site, would imply environment item 4 of that site. |
| $PROP23$ | When used in a rule assigned to a specific equipment item, would imply property 23 of that equipment. |
| $LABEL.DEF$ | When used in a rule assigned to a specific equipment item, would imply the default label of that equipment. |

Objects can become sub-levels of other objects when a rule needs to access an item outside its container's scope. The following example shows how to access an equipment property at another site within the same system.

$SITE3.EQUIP12.PROP2$

The following special tokens may also be supported.

PARENT—returns the object's parent

CHILDnnn—returns the child object with Product ID nnn

SELF—returns the object itself (usually not necessary due to implicit resolution rules)

RACKMATEnnn—returns the object on the rack identified as Item ID nnn in the rack template QUANTITY—the quantity of a part in the parts list (see part inclusion rules) or the quantity of children of a specified Child Product ID LEFT, RIGHT, TOP, BOTTOM—relative positions on a rack In a specific embodiment of the present invention, these other conditions must also be met:

All variable tokens and action codes must begin and end with the "$" delimiter

Variable tokens may omit number identifiers and higher hierarchy levels.

The "." is used to delineate changes in hierarchy level. For example $PROP23.OPT2$, signifies option 2 of property 23.

All logical statements are enclosed in parenthesis as in the following example: ($PROP2$="No")& ($PROP4$<$PROP3$).

The ";" is used to separate multiple actions in an effect statement, for example $PROP8$=63; $PROP8$=$LOCK$. This example sets property 8 to 63 and locks that property to disable further changes.

The "~" is used to denote connectivity. In condition statements it is used to check for an existing connection while in an effect statement it is used to create a connection.

IV. Rules Handling

A. Configuration Process

Figure 5:
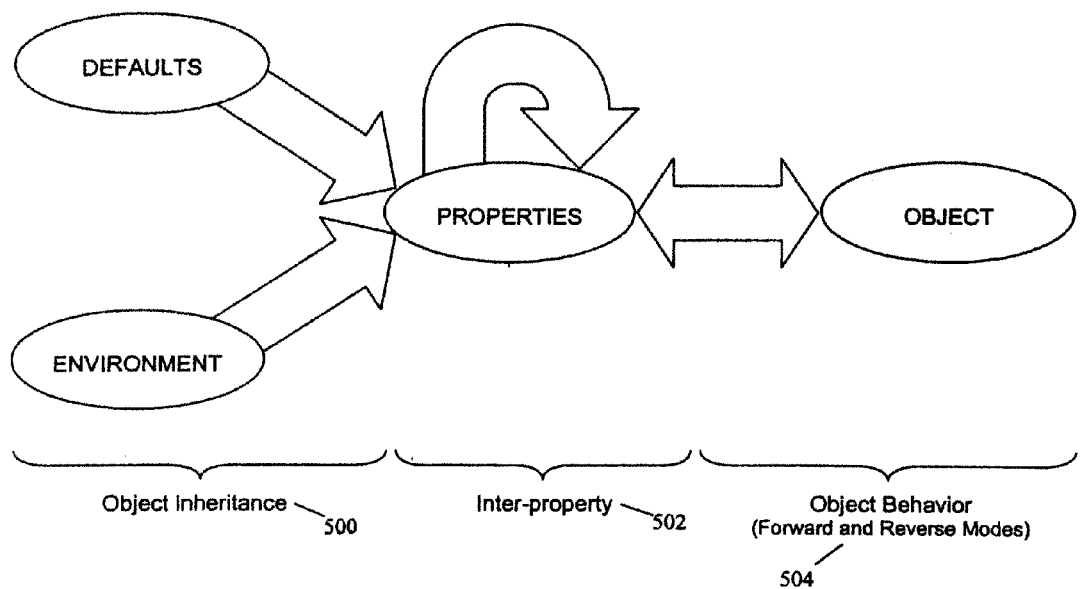
FIG. 5 is a diagram illustrating the equipment configuration process in accordance with a specific embodiment of the present invention.

FIG. 5 is a diagram illustrating the equipment configuration process in accordance with a specific embodiment of the present invention. Equipment configuration is a layered process that begins with inheritance at object creation 500, inter-property 502 and smart part number configuration rules during the manipulation of object properties, and the modification of the object's physical representation via object behavior rules 504.

1. Object Inheritance

When an object is created, the object's properties inherit values based on top-level defaults, the object's container and the environment. FIG. 6 is a diagram illustrating an inheritance hierarchy in accordance with a specific embodiment of the present invention. Typically, these inherited values or settings are changeable by the user at each inheritance point. For example a site object 600 may inherit a configuration parameter from the top-level settings 602. This parameter may be over-ridden by the user at the site level. An equipment object 604 that is then created at that site may then inherit that site (container) level parameter. Once inherited, that parameter may also be over-ridden by the user. Changes to top-level and/or container objects do not automatically effect a similar change in an object's previously inherited values.

2. Equipment Configuration (Forward Only Mode)

The configuration process is based on user manipulation of an object's properties or configuration points. These property modifications lead to rule-based changes to the object's properties, which in turn lead to rule-based changes in the object's representation. A typical equipment object is configured using the following process.

a) User selects an option or enters a value for an equipment property b) Rules that are conditional on that property are then executed. Based on these rules, consumable resources are incremented or decremented. If a consumable drops below zero, the user is notified. Whether the requested change is allowed or not is dependant on the criticality setting associated with the consumable. The effects of inter-property rules on the object's properties are then displayed to the user. Examples of these types of effects include the enabling and disabling of options within a property, setting a property value, locking/un-locking a property and hiding/un-hiding a property etc. The inter-property configuration of Smart Part Number based products differs at this stage. See the Smart Part Number section for further details.

c) Object behavior rules are then executed in order to modify the object's physical representation as a result of these property changes. Examples of these types of changes include display label, object size, port types and port quantities, etc. Changes that cause the removal or hiding of a connected port would also lead to the deletion of that connection as well.

d) Steps a through c are repeated until the equipment configuration is completed.

3. Equipment Configuration (Forward/Reverse Mode)

This configuration mode provides a mechanism in which a user may a) manipulate certain aspects of an objects representation, connectivity and racking and have the objects properties reflect the appropriate configuration changes or b) manipulate the object's properties to effect changes in the object representation. Even though item b seems to duplicate the Forward Only Mode described earlier, there is an important difference in the implementation. This Forward/Reverse Mode configuration functionality is implemented with bi-directional condition/effect rules. In the forward direction the condition is tested and the effect is executed and in the reverse mode the effect statement is tested and the condition is executed. One has to be careful in coding these rules to ensure that this bi-directional nature is preserved. Examples of both valid and invalid rules are shown below.

EXAMPLE 1

| Condition: | $PROP6$ = "Yes" |
|---|---|
| Effect: | $CHILD35.QUANTITY$ = 3 |

EXAMPLE 2

| Condition: | $PROP6$ = "Yes" \| $PROP7$ = "Yes" |
|---|---|
| Effect: | $CHILD35.QUANTITY$ = 3 |

In example 1 the condition and effect statements are both valid for bi-directional use because the condition statement is also a valid effect statement. In the forward mode, child 35's quantity is adjusted to 3 when property 6 is "Yes". In the reverse mode, property 6 is set to "Yes" when the quantity of child 35 is modified by addition/deletion to 3. In example 2, we see that the statements are ok in the forward mode but are not valid for reverse mode operation. This is because in reverse mode we do not know whether to adjust property 6 or property 7. In general, these bi-directional statements cannot use or logic, greater-than, less-than or not-equal-to comparisons.

The encoding of these bi-directional rules may require the following items.

Product ID—the product ID associated with this rule

Rule ID—a unique ID for each rule

Rule Type—signifies the type of rule (child creation/deletion, product racking, associate racking or associate connectivity)

Restriction—specifies a directionality restriction on the rule (bi-directional, forward only or reverse only)

Fixed Property Condition—a condition that is tested in both forward and reverse modes Dynamic Property Statement—in forward mode acts as a condition, in reverse mode as an effect Dynamic Object Statement—in forward mode acts as an effect, in reverse mode as a condition In forward mode these rules would operate based on the following.

If the Dynamic Property Statement and Fixed Property Condition are true then execute the Dynamic Object Statement.

In reverse mode these rules would operate based on the following.

If the Dynamic Object Statement and Fixed Property Condition are true then execute the Dynamic Property Statement.

The Fixed Property Condition is necessary in order to separate the changeable properties from the conditional-only properties. The need for this separation is shown in the following example.

Rule 1:

| Condition: | $PROP3$ = 2 & $PROP7$ = "Yes" |
|---|---|
| Effect: | $CHILD35.QUANTITY$ = 3 |

Rule 2:

| Condition: | $PROP3$ = 1 & $PROP7$ = "No" |
|---|---|
| Effect: | $CHILD35.QUANTITY$ = 3 |

Both of these rules are fine in forward mode but cause a conflict in reverse mode. This conflict is resolved when the Fixed Property Condition is used as shown below.

Rule 1:

| Dynamic Property Statement: | $PROP3$ = 2 |
|---|---|
| Fixed Property Condition: | $PROP7$ = "Yes" |
| Dynamic Object Statement: | $CHILD35.QUANTITY$ = 3 |

Rule 2:

| Dynamic Property Statement: | $PROP3$ = 1 |
|---|---|
| Fixed Property Condition: | $PROP7$ = "No" |
| Dynamic Object Statement: | $CHILD35.QUANTITY$ = 3 |

Now in reverse mode the appropriate change in property 2 is made based on the setting in property 7.

4. Smart Part Number Functionality

The Smart Part Number function supports manufacturer part numbers which carry configuration information within the part number itself. Such part numbers are usually a combination of letters, numbers and other symbols (configuration codes) which when put together in the appropriate sequence, convey product configuration and may also convey costing and pricing information as well. Support for these smart part numbers may be implemented as follows.

Figure 7:
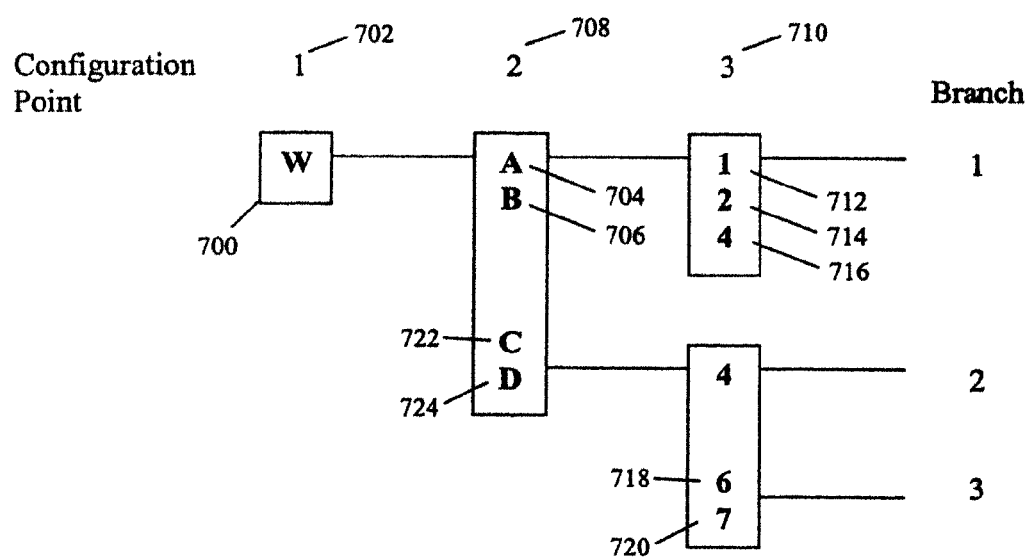
FIG. 7 is a diagram illustrating configuration rules in accordance with a specific embodiment of the present invention.

Because these smart part numbers are comprised of a series of configuration codes, a mechanism must be defined to capture the rules that define proper sets of codes that would convey valid configurations. FIG. 7 is a diagram illustrating configuration rules in accordance with a specific embodiment of the present invention. More particularly, FIG. 7 illustrates the following configuration rules:

1. "W" 700 is the only valid selection for configuration point 1 702.
2. By choosing either selection "A" 704 or "B" 706 for configuration point 2 708, the only available selections for configuration point 3 710 are "1" 712, "2" 714 and "4" 716.
3. Selections "6" 718 and "7" 720 for configuration point 3 710 are only valid if you choose either selection "C" 722 or "D" 724 for configuration point 2 708.
4. "WB4..." would be an example of a valid configuration and part number The encoding of these rules may be implemented as follows:

1. Each branch is coded into a character string. A branch is defined as a valid path in the configuration tree.
2. Configuration points are separated by the "|" delimiter
3. Configuration codes are separated by the "$" delimiter The encoding of the above diagram would then be implemented as follows

| Branch 1: | $W$|$A$B$|$1$2$4$|... |
|---|---|
| Branch 2: | $W$|$C$D$|$4$|... |
| Branch 3: | $W$|$C$D$|$6$7$|... |

This mechanism facilitates the encoding of these rules via a graphical user interface that allows a user to manipulate the above diagram. The diagram would then be automatically encoded into the defined rule syntax. The diagram may also be recreated from rules that were encoded in the defined syntax.

In addition to the encoding of each branch in the configuration tree, a mechanism may be required to define the significance of each of the selections within the tree. This may be accomplished by defining a lookup that conveys the possible selections at each configuration point, the label or description of the selection, a fragment of the final product description associated with that selection, the price and cost associated with that selection and a conditional test which qualifies when this set of information is applied. An example of such a lookup is shown below.

| ConfigPt | Code | Label | Condition | Price | Cost | Desc Fragment |
|---|---|---|---|---|---|---|
| 1 | W | Widget |  | 100 | 60 | Basic Widget |
| 3 | 4 | Blue | $CP2$ = "A" | 20 | 15 | Blue Color |
| 3 | 4 | Blue | $CP2$ = "B" | 25 | 18 | Blue Color |

The condition statement can be used to construct complex descriptions based on the product's configuration. The condition statement can also be used for non-linear or dynamic pricing and costing based on the product's configuration or other conditions. In the case above, the price and cost of selection 4 changes depending on whether the user selects option "A" or "B" for configuration point 2.

The product's overall part number may be determined by sequentially concatenating the selected codes for each configuration point starting with configuration point 1. The resulting part numbers are stored with a delimiter between each configuration point. This delimiter is stripped away whenever the part number is displayed to the user. An example delimited part number would be "W$B$4$...."

The product's overall description may be determined by sequentially concatenating the description fragments for each configuration point starting at configuration point 1, while ensuring that conditions statements are properly evaluated.

The price and cost may be determined by summing the price/cost values for the selected code at each configuration point. The conditions are evaluated to determine the appropriate price and cost for the specified code. These condition statements enable the non-linear pricing and costing of options. As seen in the above example, the price of the Blue color is not constant across all configurations. The condition statement allows for the price and cost of the Blue color option to change based on the configuration of the equipment. In cases where the pricing and/or costing are linear, the condition statement may be omitted.

B. Product Attribute Rules

Each object has certain aspects or attributes that need to be known and controlled because they may have an impact on overall system design and/or cost. Examples of such attributes include:

Power Consumption (both AC and DC)
Heat Dissipation
Shipping and Installed Product Weight
Other User Defined Attributes Because these attributes may affect the overall design of the system, a mechanism is necessary to determine the value of these attributes as the equipment object is modified in the configuration process. This mechanism is implemented via condition/effect rules that adjust these attribute values based on the object's configuration and/or the environment. An example of this attribute rule mechanism for AC power consumption follows.

Rule 1:

| Condition: | 1 |
|---|---|
| Effect: | 400 |

Rule 2:

| Condition: | $PROP2$ = "Type A" |
|---|---|
| Effect: | −50 |

Rule 3:

| Condition: | $PROP3$ = "High Output" |
|---|---|
| Effect: | 100 |

These product attribute rules would be processed whenever the attribute value needs to be known. In this example the AC power consumption for the High Output version of this equipment would by 500 W. In case the object was configured for Type A and High Output, the power consumption would be 450 W. Note that the attribute effects are cumulative and individual rules may add or subtract from the attribute value. Also note that, as in the case of rule 1, the condition may be set to "1" which in effect becomes a default or base value for the attribute. The attribute value is always set to zero or a default value as the initial condition prior to processing the attribute rules.

In order to encode these rules the following items may be needed.

Product ID—the ID of the product this rule applies to
Rule ID—a unique ID for this rule
Attribute Code—specifies the attribute adjusted by this rule
Condition—the condition under which this effect is applied
Effect—the attribute adjustment value C. Inter-connection Process In order to connect two equipment objects together, one needs to determine if the connection is possible and the cable necessary to complete the connection. This process is implemented via two different mechanisms. The dynamic connection process allows for the connection of any two products based on data specified in the product models. The aspects of the model used in this process are a) port and connector detail 2) payload, protocol and signal types and 3) cabling requirements. This process is best suited for two-point simplex or duplex connections. The second connection mechanism is based on pre-written custom connection rules that define how equipments may be connected and the cabling required for that connection. This mechanism is useful for complex connections with complex cabling. For example, custom connection rules can be used to encode n port to m port connections utilizing spider cables. This mechanism is also useful where special or specific cables are required for standard two-point connections.

Figure 8:
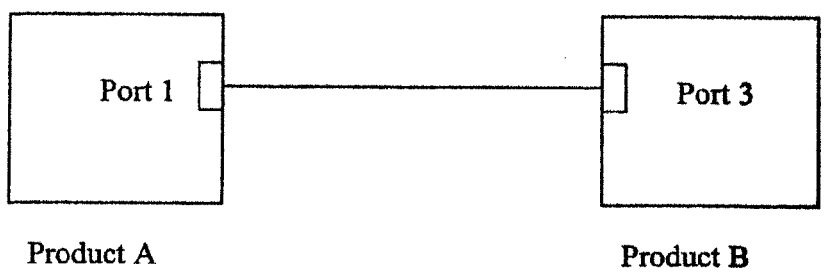
FIG. 8 is a diagram illustrating how a simple two-point connection would be encoded in accordance with a specific embodiment of the present invention.

1. Custom Connection Rules:

Custom connection rules allow for the codification of specific connections between equipments. These rules also define the specific cable and quantity necessary to execute the connection. In the following examples the cable quantity is one for all cases and is omitted for clarity. These connection rules may be coded using the concept of connection fragments that define a connection between a port and the connection medium, typically a cable. Using this coding concept, a minimum of two connection rule fragments is required for a complete connection rule. FIG. 8 is a diagram illustrating how a simple two-point connection would be encoded in accordance with a specific embodiment of the present invention. In this simple example, two fragments 800, 802 are encoded in the table 804. All fragments in a connection rule must have the same Rule ID and distinct Fragment IDs. The rule fragments also specify the cable necessary for this connection. In the case of a wireless connection, the Cable ID would not be necessary. The Self Connect flag is usually set to 0 except for special case rules which would inter-connect ports on the same equipment object.

Figure 9:
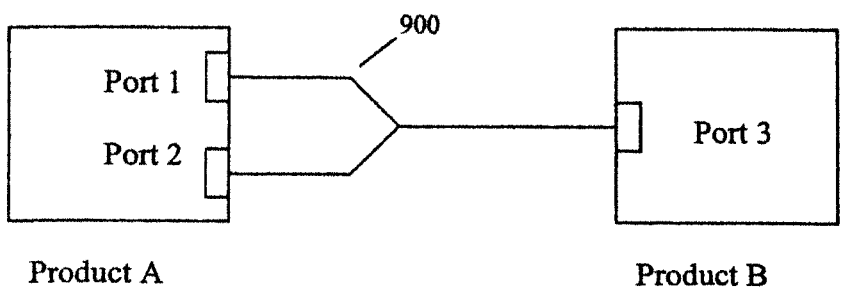
FIG. 9 is a diagram illustrating a "Y" connection example in accordance with a specific embodiment of the present invention.

This concept can be extended to more complex connections as in the "Y" connection example. FIG. 9 is a diagram illustrating a "Y" connection example in accordance with a specific embodiment of the present invention. Here the connection 900 has two branches on one end.

Figure 10:
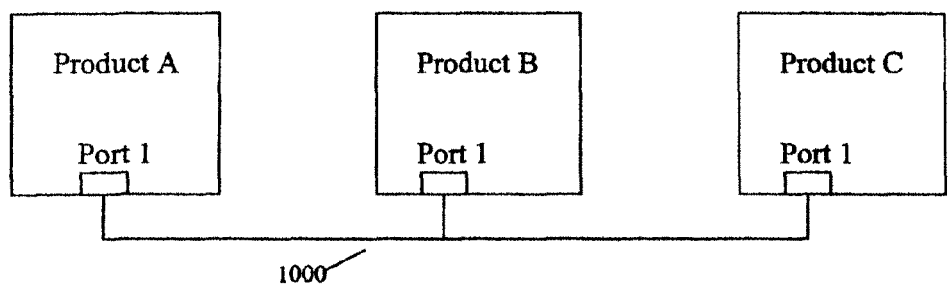
FIG. 10 is a diagram illustrating daisy chain type connection rule encoding in accordance with a specific embodiment of the present invention.
Figure 11:
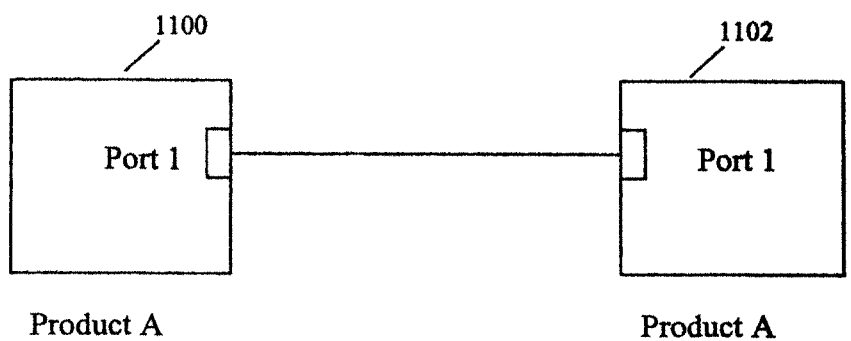
FIG. 11 is a diagram illustrating connections between the same product types in accordance with a specific embodiment of the present invention.

A more complex case entails the coding of a daisy chain type connection rule. FIG. 10 is a diagram illustrating daisy chain type connection rule encoding in accordance with a specific embodiment of the present invention. Here the connection has more than two endpoints Additionally, two special conditions may be dealt with in the following two examples. The first example deals with connections between the same product types. FIG. 11 is a diagram illustrating connections between the same product types in accordance with a specific embodiment of the present invention. Here products 1100 and 1102 are identical.

Figure 12:
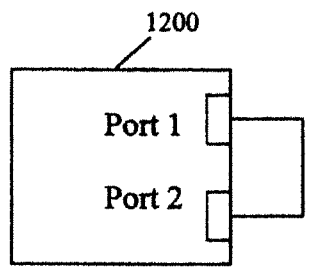
FIG. 12 is a diagram illustrating connections within a product itself in accordance with a specific embodiment of the present invention.

This second example deals with connections within a product itself. In this case the Self Connect flag set to 1 to signify a connection within the same piece of equipment. FIG. 12 is a diagram illustrating connections within a product itself in accordance with a specific embodiment of the present invention. Here the product 1200 connects to itself.

Figure 13:
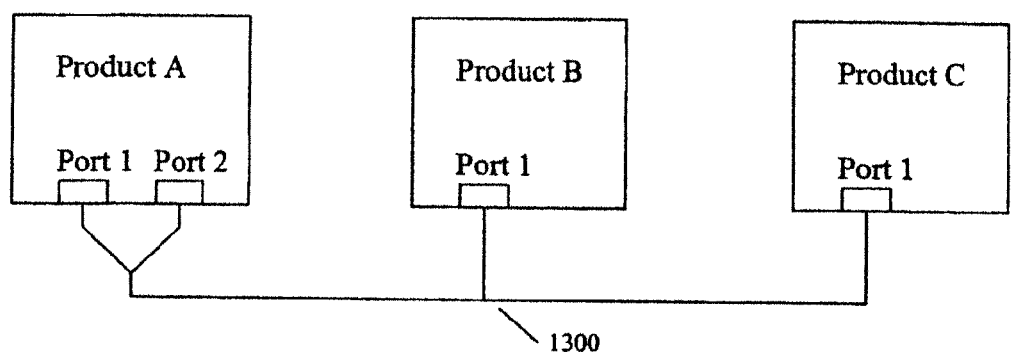
FIG. 13 is a diagram illustrating a complex connection in accordance with a specific embodiment of the present invention.

FIG. 13 is a diagram illustrating a complex connection in accordance with a specific embodiment of the present invention. This example combines all of the above connection rule concepts 1300 to encode a very complex connection. Again in this case the Self Connect flag is set to one to denote that connection fragments 1 and 2 originate from the same piece of equipment.

Figure 14A:
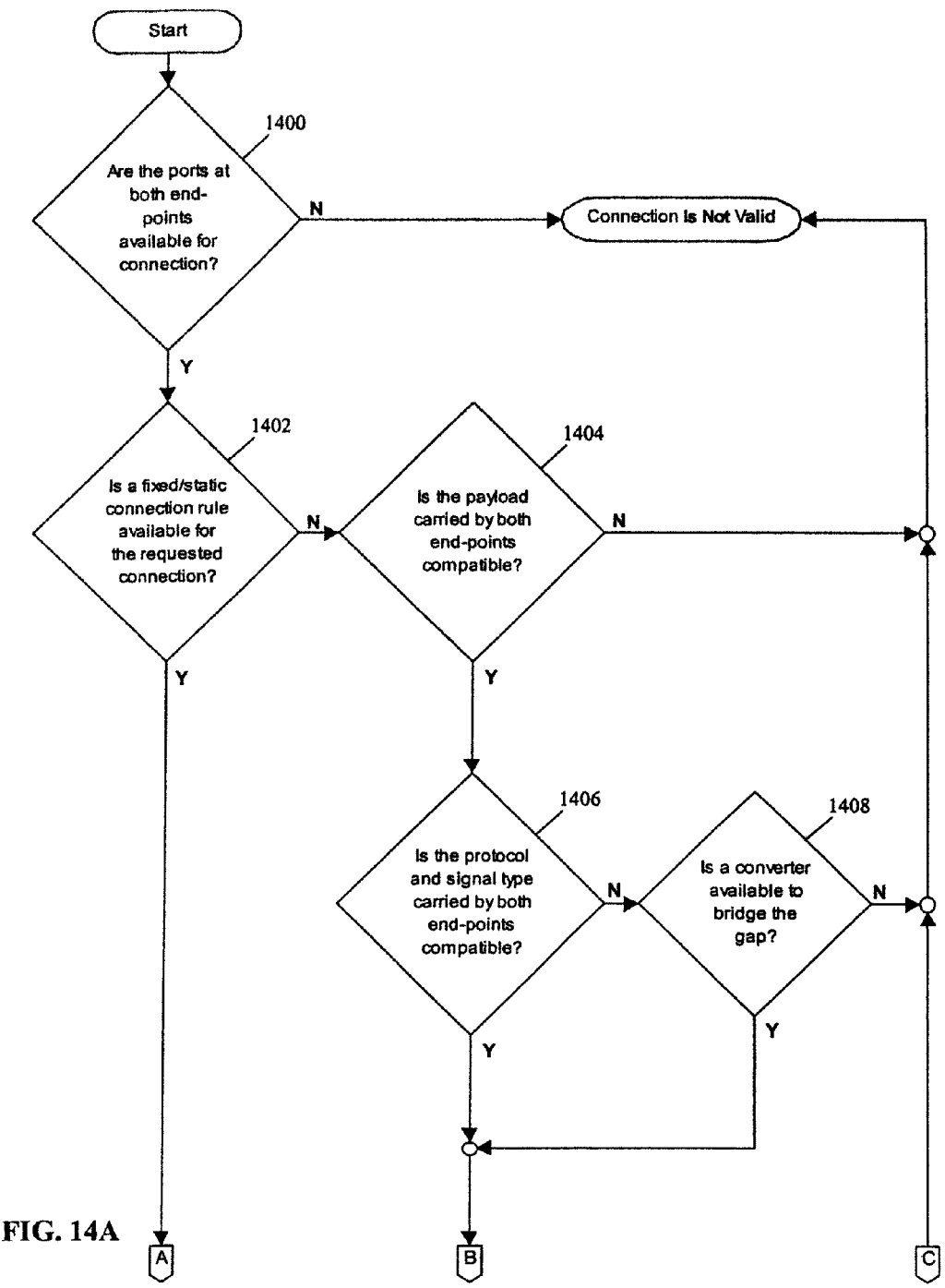
FIG. 14A and FIG. 14B are flow diagrams illustrating a method for determining when a desired connection is valid in accordance with a specific embodiment of the present invention
Figure 14B:
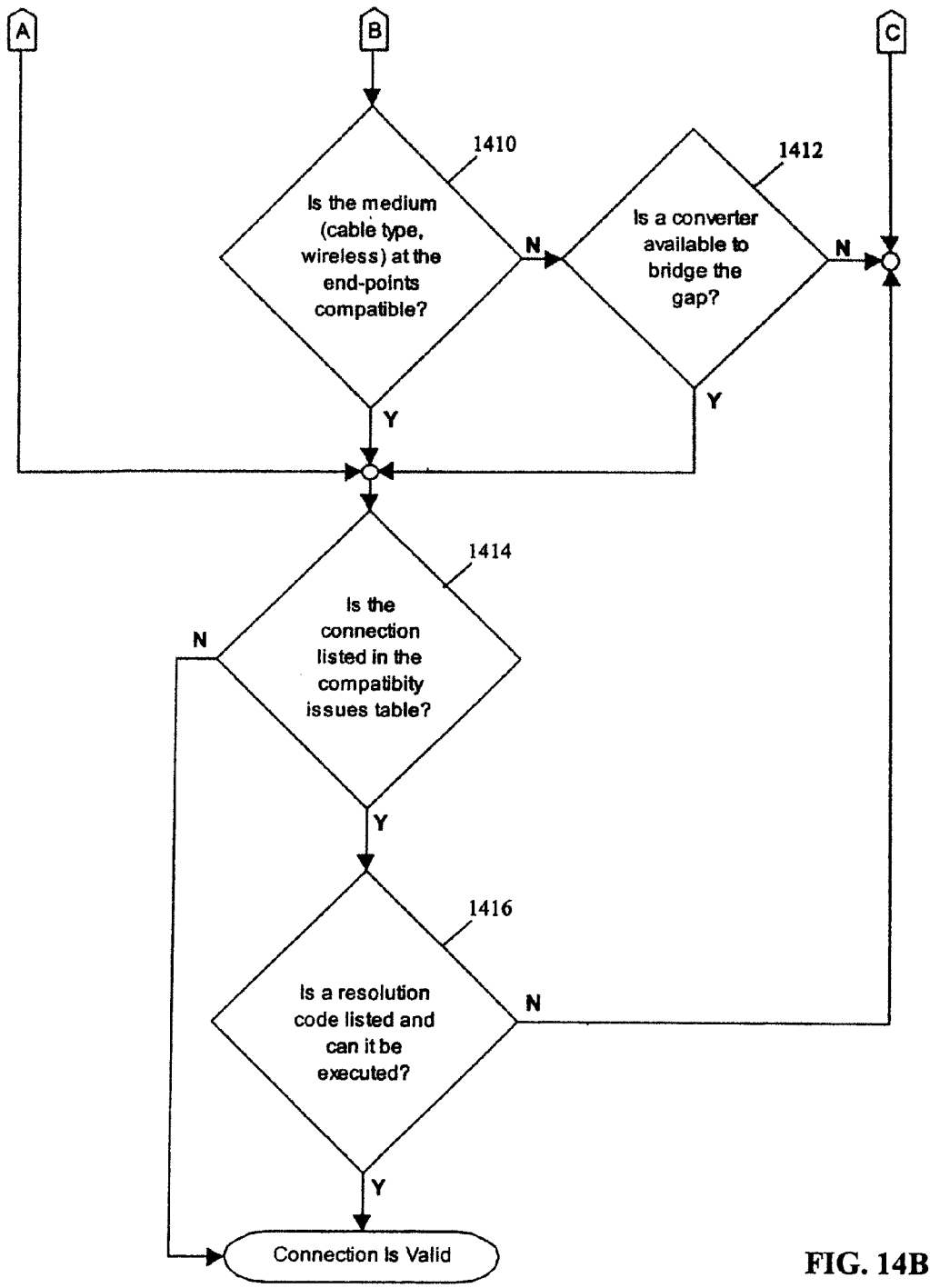

2. Dynamic Connection Process:

The dynamic connection process enables the determination of valid connections based on parameters that define the ports, connectors, signal types, protocols, payloads and the cabling requirements at each connection endpoint. FIG. 14A and FIG. 14B are flow diagrams illustrating a method for determining when a desired connection is valid in accordance with a specific embodiment of the present invention.

Payload is defined as the top-level information that is sent or received at the port. The protocol is defined as the encoding of that information and the signal is defined as the physical signal that will be carried on the connection medium. The signal would be equivalent to the first two layers (physical and data link) of the ISO reference model. A combination of a payload, protocol and signal is called port traffic or just traffic.

In general, ports are defined as input/output interfaces. The physical interface for these ports comprises a connector. In the context of product models, ports are redefined as Virtual Ports that carry information and these ports may comprise multiple connectors or pins within connectors. One virtual port can also replace two ports, as in the case of two simplex ports that may be replaced by one virtual duplex port. Ports can also support multiple payloads, protocols and signals, thus the model allows for any number and combination of payloads, protocols and signals per port. The physical connectors and/or pins assigned to a port are fixed.

At 1400, it is determined if the ports at both end-points are available for connection. If not, the connection is not valid. If so, at 1402, it is then determined if a fixed/static connection rule is available for the requested connection. If no fixed/static connection rule is available, at 1404 it is determined if the payload carried by both end-points is compatible. If not, the connection is not valid. If the payload carried by both end-points is compatible, then at 1406 it is determined if the protocol and signal type carried by both end-points is compatible. If not, at 1408 it is determined if a converter is available to bridge the gap. If not, the connection is not valid. If at 1406 it is determined that the protocol and signal type carried by both end-points is compatible or at 1408 it is determined that a converter is available to bridge the gap, then at 1410 it is determined if the medium at the end-points is compatible. If not, at 1412, it is determined if a converter is available to bridge the gap. If no converter is available, the connection is not valid. If at 1402 it was determined that a fixed/static connection rule is available for the requested connection, or at 1410 it is determined that the medium at the end-points is compatible, or at 1412 it is determined that a converter is available to bridge the gap, then at 1414 it is determined if the connection is listed in the compatibility issues table. If so, at 1416 it is determined if a resolution code is listed and executable. If not, the connection is not valid. If at 1414 it was determined that the connection was not listed in the compatibilty issues table or at 1416 it was determined that a resolution code was listed and executable, then the connection is valid.

Figure 15:
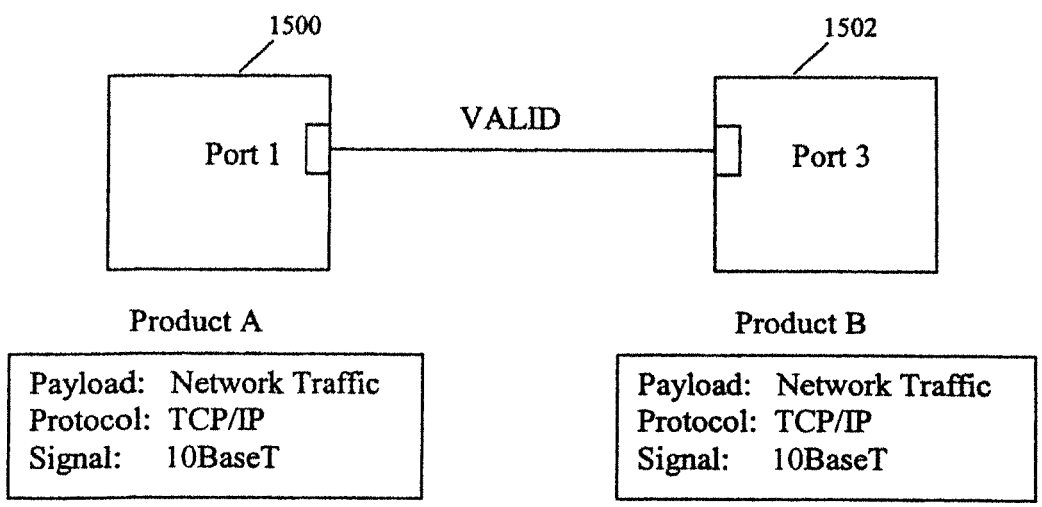
FIG. 15 is a diagram illustrating an example of a connection between two simple and standard ports in accordance with a specific embodiment of the present invention.

The determination of whether the payload, protocol and signals are compatible is straightforward for most connections. In the case of a connection between two simple and standard ports, the interconnection logic is straightforward. FIG. 15 is a diagram illustrating an example of a connection between two simple and standard ports in accordance with a specific embodiment of the present invention. Port 1 1500 is connected to port 3 1502.

Figure 16:
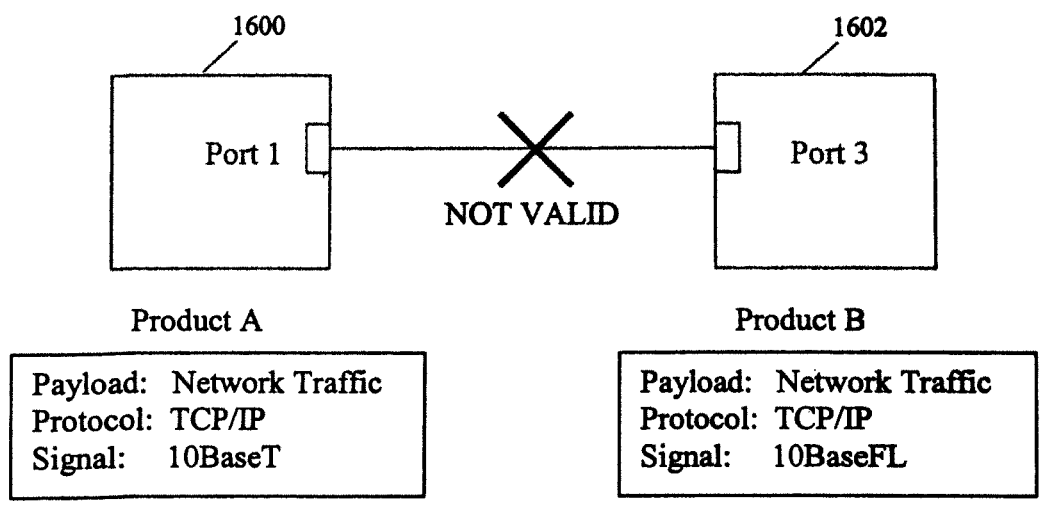
FIG. 16 is a diagram illustrating an example of an invalid connection due to incompatible signals in accordance with a specific embodiment of the present invention.
Figure 17:
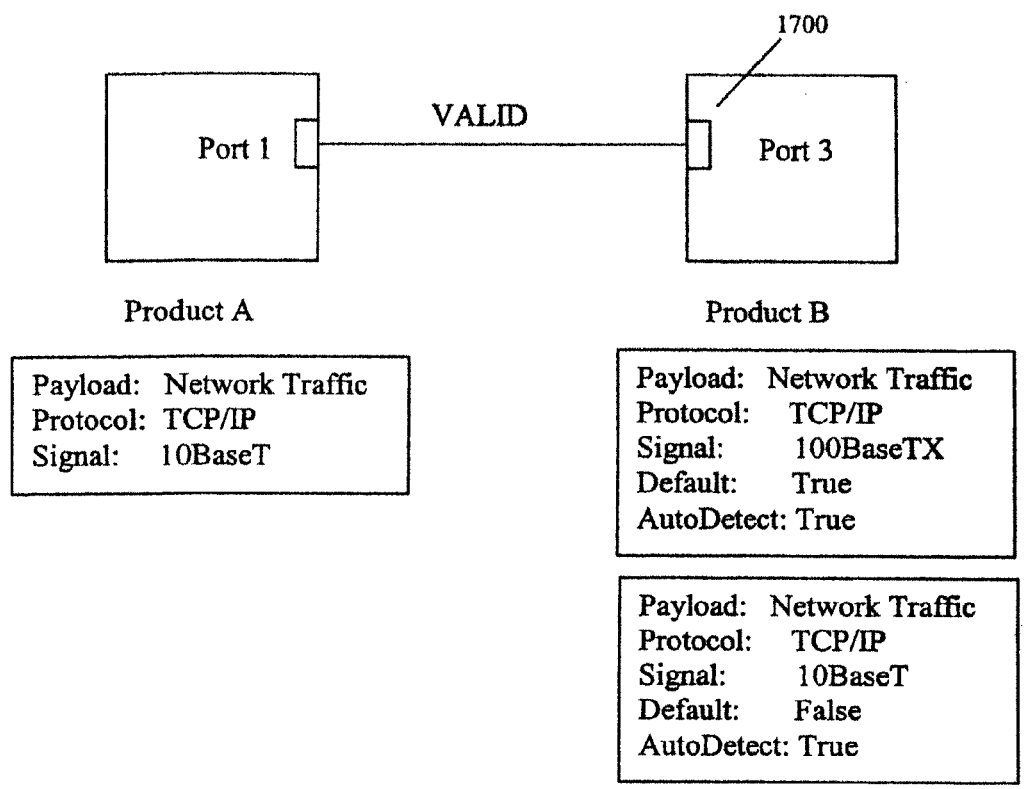
FIG. 17 is a diagram illustrating a valid connection with adaptive ports in accordance with a specific embodiment of the present invention.
Figure 18:
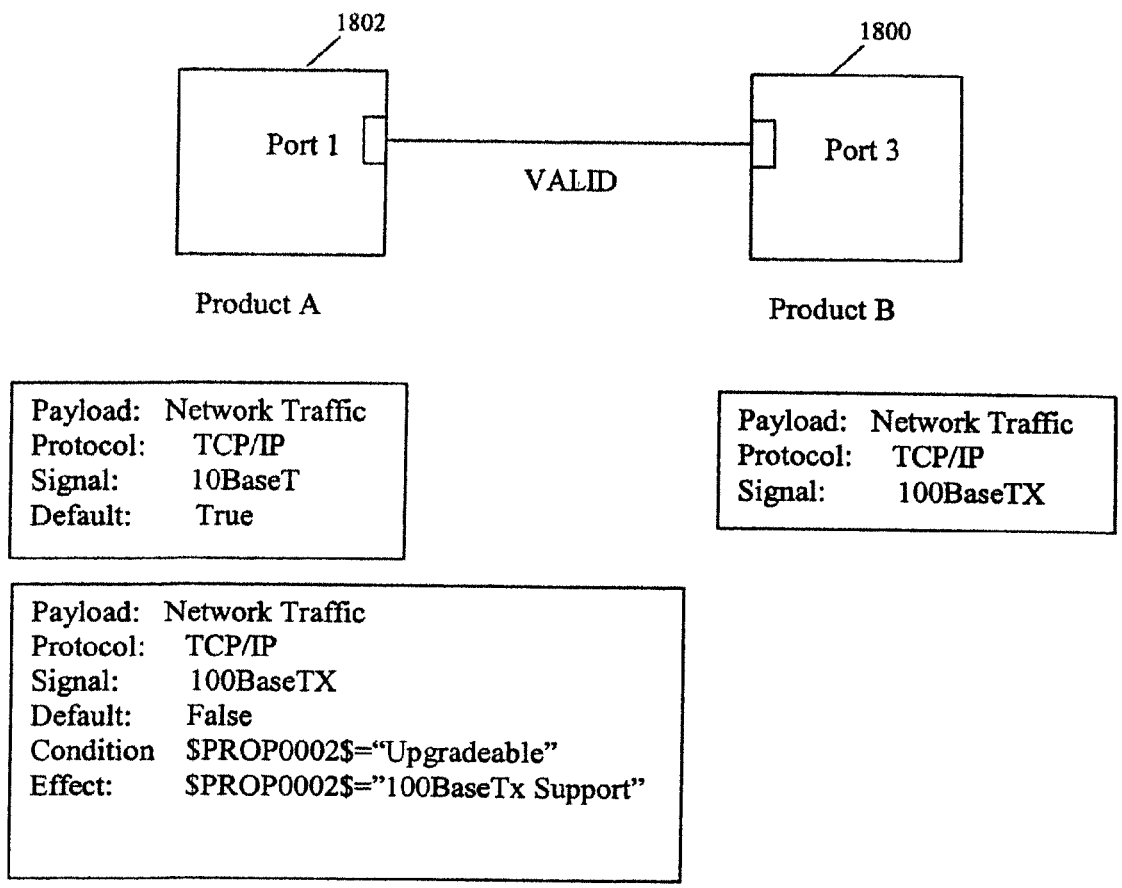
FIG. 18 is a diagram illustrating another valid connection in accordance with a specific embodiment of the present invention.

FIG. 16 is a diagram illustrating an example of an invalid connection due to incompatible signals in accordance with a specific embodiment of the present invention. Port 1 1600 cannot be connected to port 3 1602.

The above examples are simple to analyze because the payload, protocol and signals are all industry standard. Not every product will utilize such standards. In these cases, the interconnection logic becomes a bit more involved. In cases where the equipments to be connected are from the same manufacturer, the protocols and signal types would be easy to match. In cases where the equipment is from different manufactures and where proprietary protocols and signals may be used, a more detailed analysis is required. In any case, the following guidelines should be followed.

The payloads must be compatible

The protocols must be compatible

The signals must be compatible or if the signals are proprietary, the low level parameters must be compatible In the case of differing signals, the analysis shift to the underlying signal parameters such as signal type, frequency, modulation, encoding and minimum/maximum levels etc. In order for the two signals to be compatible, the signal types, frequencies, encoding and modulation must match. The transmit signal levels must also meet the receive signal levels requirements in both direction.

3. Compatibility Issue Checks:

An important part of the dynamic connection process is the checking of a proposed connection against an issues or compatibility problems repository. This check is done as the last step of the validation process. This issues repository is linked to individual products and ports/traffic and contains descriptive and programmatic information about the problem and possible resolution. The repository may contain the following items.

Issue ID—unique identifier for this issue
Issue Description—a user viewable description of the issue
Issue Condition—a rules based condition that must be met for this issue to occur (optional)
Issue Cable ID—a cable which must be used for this issue to occur (optional)
Resolution Code—specifies whether to only warn the user (no resolution), warn the user if the Condition is true (no resolution) or change the equipment configuration if the Condition is true
Resolution Description—a user viewable description of the resolution
Resolution Effect—a rules based effect that is executed to resolve the issue
Resolution Cable ID—a cable that may be used a part of the solution This repository is linked to actual products via an Issue Membership. Each of the participants in an issue would have an entry in this membership. This membership may contain the following items.

Issue ID—unique identifier for this issue
Issue Member ID—unique identifier for the product member
Issue Side Code—an identifier that specifies which side of the connection issue this entry is associated with
Product ID—the identifier for the product associated with this issue
Port Group ID—the identifier for the port group associated with this issue
Port Type ID—the identifier for the port type associated with this issue
Port ID—the identifier for the port associated with this issue
Port Traffic ID—the identifier for the port traffic associated with this issue A membership entry is not required to specify the all of the IDs as shown above. Each entry must provide the IDs needed to specify down to the level where the problem arises. Therefore if a problem occurs with the connection of any port of a specific port type, then the port and port traffic IDs may be omitted.

The issue side code allows multiple entries from one product or multiple products to participate in one issue. For example if a connection between product A and product X cause a conflict and a connection between product B and product X case the same issue then each product would have individual entries in the membership with products A and B sharing the same issue side code. Care must be taken when using this approach because the issue condition and resolution effect statements, which act on product configuration, would become inefficient when many products are involved.

4. Adaptive Ports:

In many cases, a port may be able to handle multiple traffic types. Traffic is defined as a combination of payload, protocol and signal. The handling of these different traffic types, by the equipment, may be automatic or may require configuration changes. The product models allow for the delineation of all the traffic types that a port can handle. Each traffic type that is handled by a port may also specify the following parameters:

Default—defines if this port traffic is the default traffic type for the port
AutoDetect—defines whether this traffic type is auto detected by the equipment
Configuration Condition—defines a configuration condition that must be met in order to support this traffic type
Configuration Effect—defines a configuration change that must be made in order to support this traffic type
Required Part ID—defines a part which is required in order to support this traffic type
Required Part Quantity—defines the quantity of the Required Part The required part ID and quantity parameters allow for the addition of parts to the parts list that are necessary for supporting the traffic type. For example, these parts may define adapters that are necessary to support different protocols and/or signals.

5. Passive Element Support:

A passive element is defined as equipment object that does not change the traffic type as it passes through the object. Objects such as jackfields, patch panels, adapters and some converters may be included in the passive element category. These objects merely pass signals through and do not generate their own signals. When these objects are modeled, their ports may be associated with connectors but not traffic—although in some cases, a signal may be assigned. The lack of port traffic assignment causes problems when attempting to connect the passive object using the dynamic connection process. This connection issue is addressed with the following three concepts.

Figure 19A:
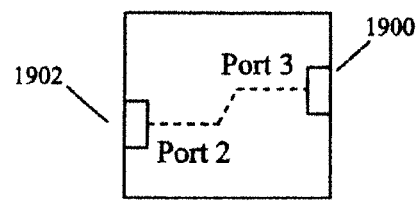
FIGS. 19A-19D are diagrams illustrating examples of passive element support in accordance with a specific embodiment of the present invention.

Pass-thru Port ID—When modeling a passive product, each passive port is assigned the port ID of the associated, internally linked port. FIGS. 19A-19D are diagrams illustrating examples of passive element support in accordance with a specific embodiment of the present invention. In FIG. 19A, port 3 1900 would be assigned as port 2's 1902 pass-thru port ID and port 2 1902 would be assigned as port 3's 1902 pass-thru port ID.

Pass-thru Tunneling Logic—Tunneling, is the process of tracing thru one or more passive elements and one or more connections in search of:

a) A passive port's terminal active port. This provides the passive port with the traffic assignments of the terminating active port.
b) An active port's terminal passive port connector. This provides the active port with the connector assignments of the terminating passive port.

Figure 19B:
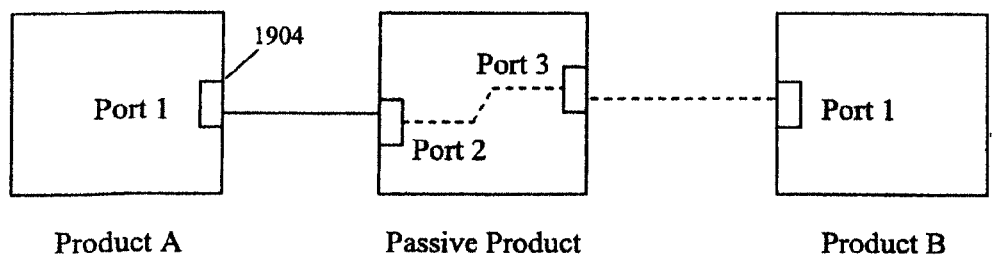
Figure 19C:
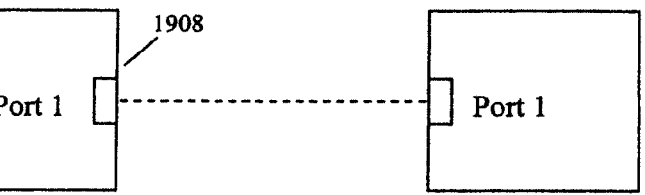

In FIG. 19B, pass-thru tunneling would determine that Product A's Port 1 1904 traffic would be available on the Passive Product's Port 3 1906. This tunneling logic is necessary when a connection is then attempted between the Passive Product and Product B. The proposed connection would be validated using the standard dynamic connection process because Port 3 1906 on the Passive Product would have a complete set of port data which includes the tunneled traffic parameters from Product A's Port 1 1904.

Figure 21:
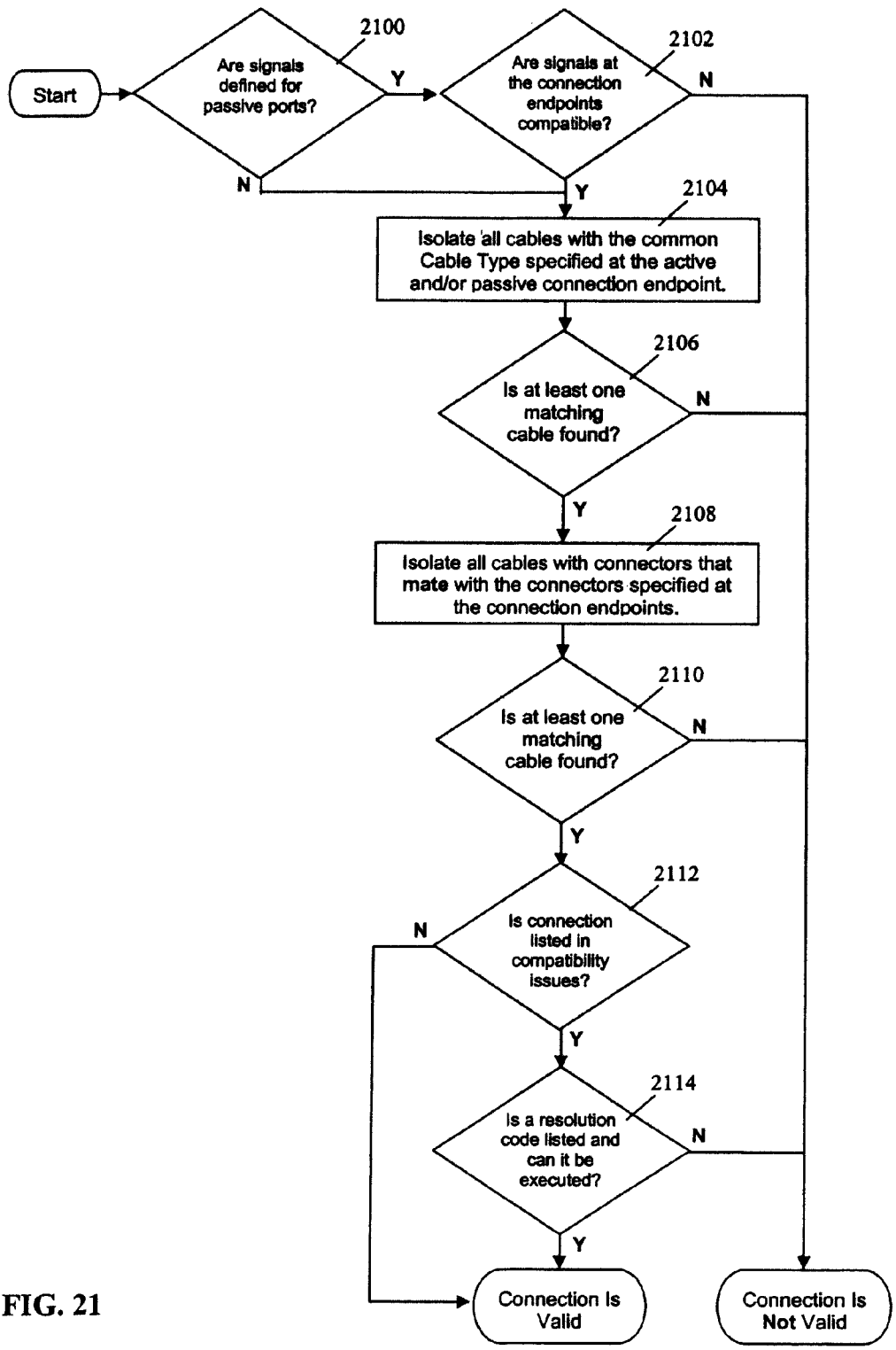
FIG. 21 is a flow diagram illustrating passive element connection validation in accordance with a specific embodiment of the present invention.

Passive Element Connection Validation—This validation logic is used when a connection is attempted between equipment where one or both are passive and where pass-thru tunneling does not locate a terminal active port for the passives involved. If terminal active ports were located for the passive elements, then the connection would be validated using the standard dynamic connection process. Passive element connection attempts are validated by testing signal types, if a signal is assigned to the passive port, and locating at least one cable for the proposed connection. FIG. 21 is a flow diagram illustrating passive element connection validation in accordance with a specific embodiment of the present invention. At 2100, it is determined if signals are defined for the passive ports. If so, at 2102 it is determined if the signals at the connection endpoints are compatible. If not, the connection is not valid. If at 2100 it was determined that the signals are defined for the passive ports or at 2102 it was determined that the signals at the connection endpoints were compatible, then at 2104 all cables with the common cable type specified at the active and/or passive connection endpoint are isolated. Then, at 2106, it is determined if at least one matching cable is found. If not, the connection is not valid. If so, at 2108 all cables with connectors that mate with the connectors specified at the connection endpoints are isolated. Then, at 2110, it is determined if at least one matching cable is found. If not, the connection is not valid. If so, at 2112 it is determined if the connection is listed in the compatibility issues. If not, then the connection is valid. If so, then at 2114 it is determined if a resolution code is listed and executable. If not, the connection is not valid. If so, the connection is valid.

This validation is not a guarantee that the connection is valid. Final validation comes only when the other end of the passive element is connected to an active product. At that point the connection is validated using complete port and traffic parameters from the active ports at the ends of the overall connection.

Figure 19D:
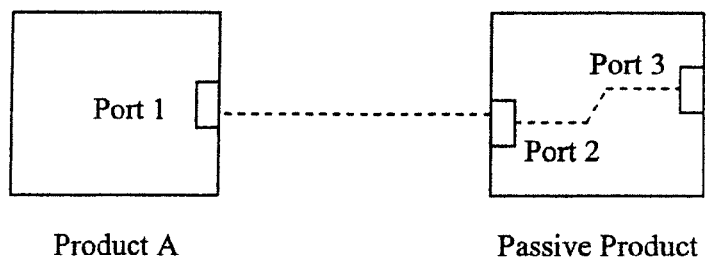
Figure 20:
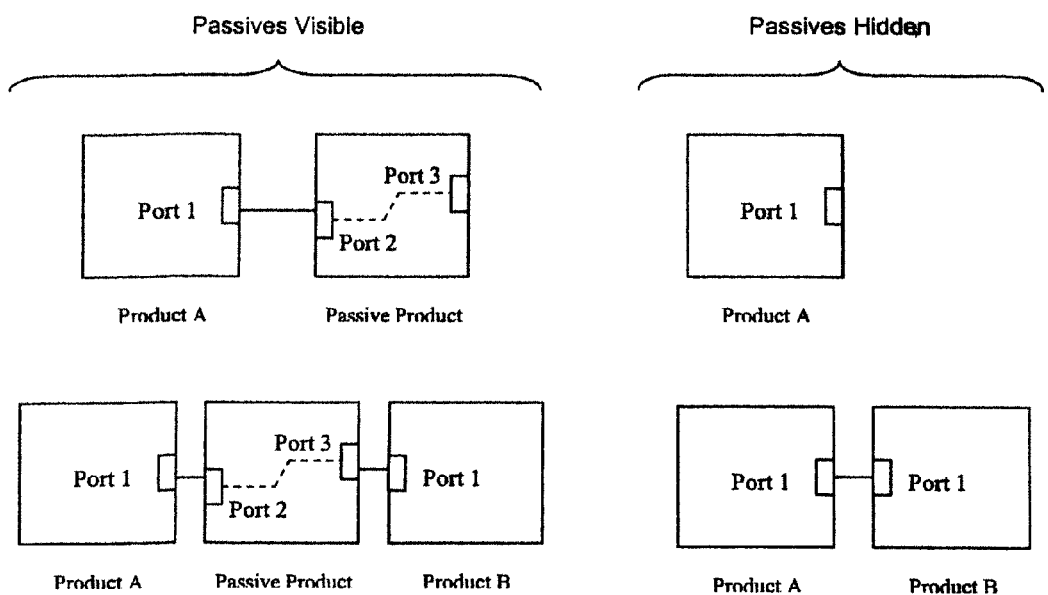
FIG. 20 is a diagram illustrating examples of a partial connection and a complete connection display in accordance with a specific embodiment of the present invention.

When the connection is attempted between Product A and the Passive Product as shown in FIG. 19D, the connection logic skips the matching of signals because, in this example, the passive did not assign a signal to port 2. The validation logic does search to make sure at least one cable is found that can make the connection. A connection attempt between port 3 on the Passive Product and another active product would then involve the full connection validation process including all of the required traffic matching tests.

The software product supports an onscreen display mode in which the passive elements are hidden. In this mode, an active product port that is connected to a passive element is shown as available for connection. This allows a user to attempt connections from this port to other product ports.

6. Cable Determination

Cables are necessary to enable "wired" connections between equipment. In the case of custom connection rules, the required cable is defined within the connection rule itself. In the case of the dynamic connection process, the appropriate cable must be determined. In cases where the dynamic connection process 1) inserts a converter into the overall connection or 2) completes a two-cable duplex connection, two separate cables require selection through this process. The determination of the appropriate cable is based on matching the cabling parameters at both ends of the connection with the parameters that are specified for each available cable and the connectors at the endpoints with the connectors on the cable. The manufacturer of the equipment specifies the cabling parameters for each signal type. The cabling parameters are described below:

Cable Type—the type of cable required for connection
Minimum Diameter—the minimum cable diameter
Maximum Diameter—the maximum cable diameter
Diameter Unit—a code that specifies the diameter unit of measure
Minimum Length—the minimum cable length
Maximum Length—the maximum cable length
Length Unit—a code that specifies the length unit of measure
Impedance—the value of impedance required for the connection cable
Capacitance—the value of capacitance required for the connection cable
Return Loss—the value of return loss required for the connection cable
Delay—the value of delay allowable in the connection cable
Shielding Type—specifies the type of shielding required for the connection cable Each cable model definition contains the following parameters (see the Cable Model section for complete details on all cable parameters).

Figure 22A:
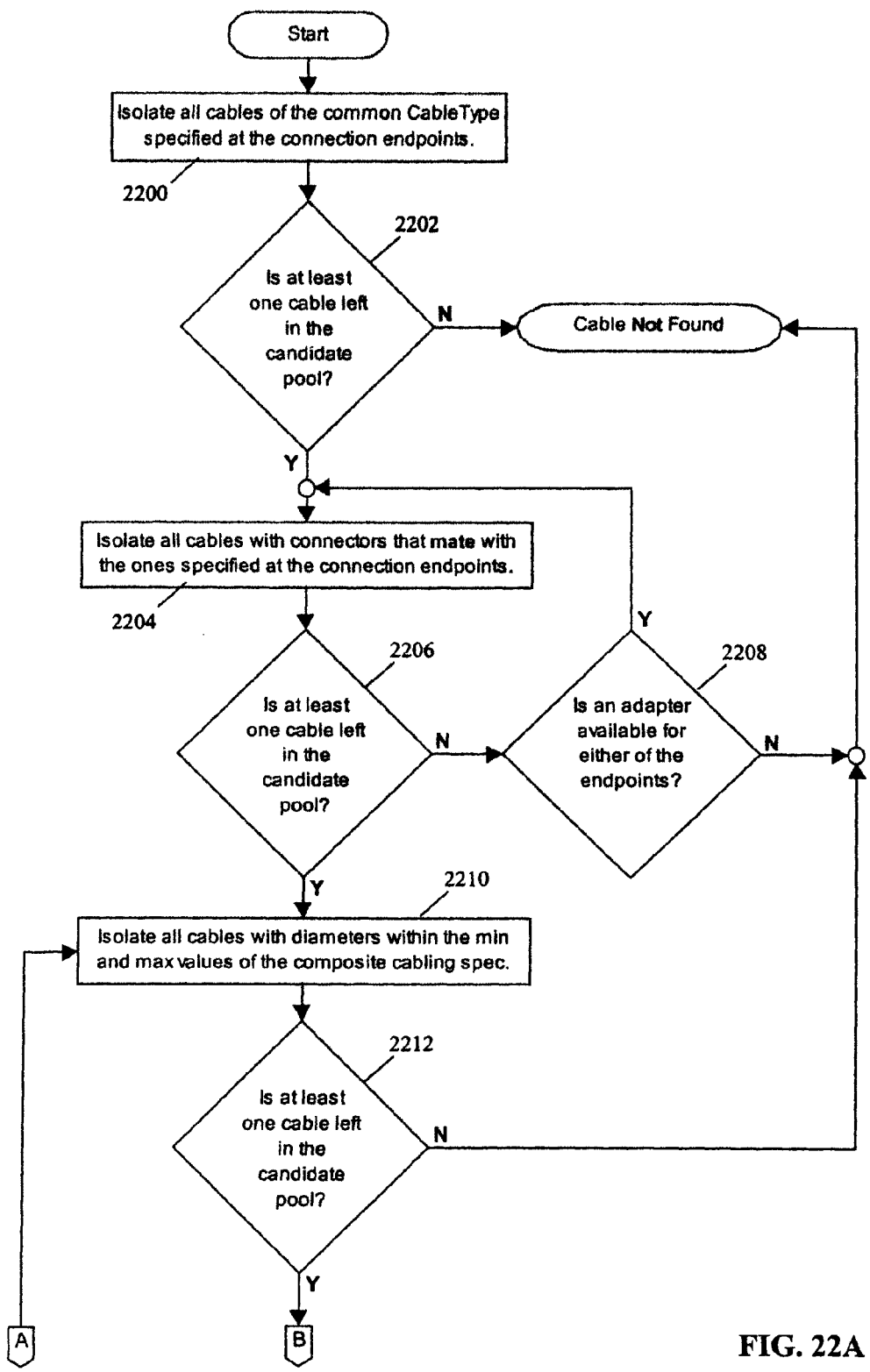
FIGS. 22A and 22B are flow diagrams illustrating cable selection in accordance with a specific embodiment of the present invention.
Figure 22B:
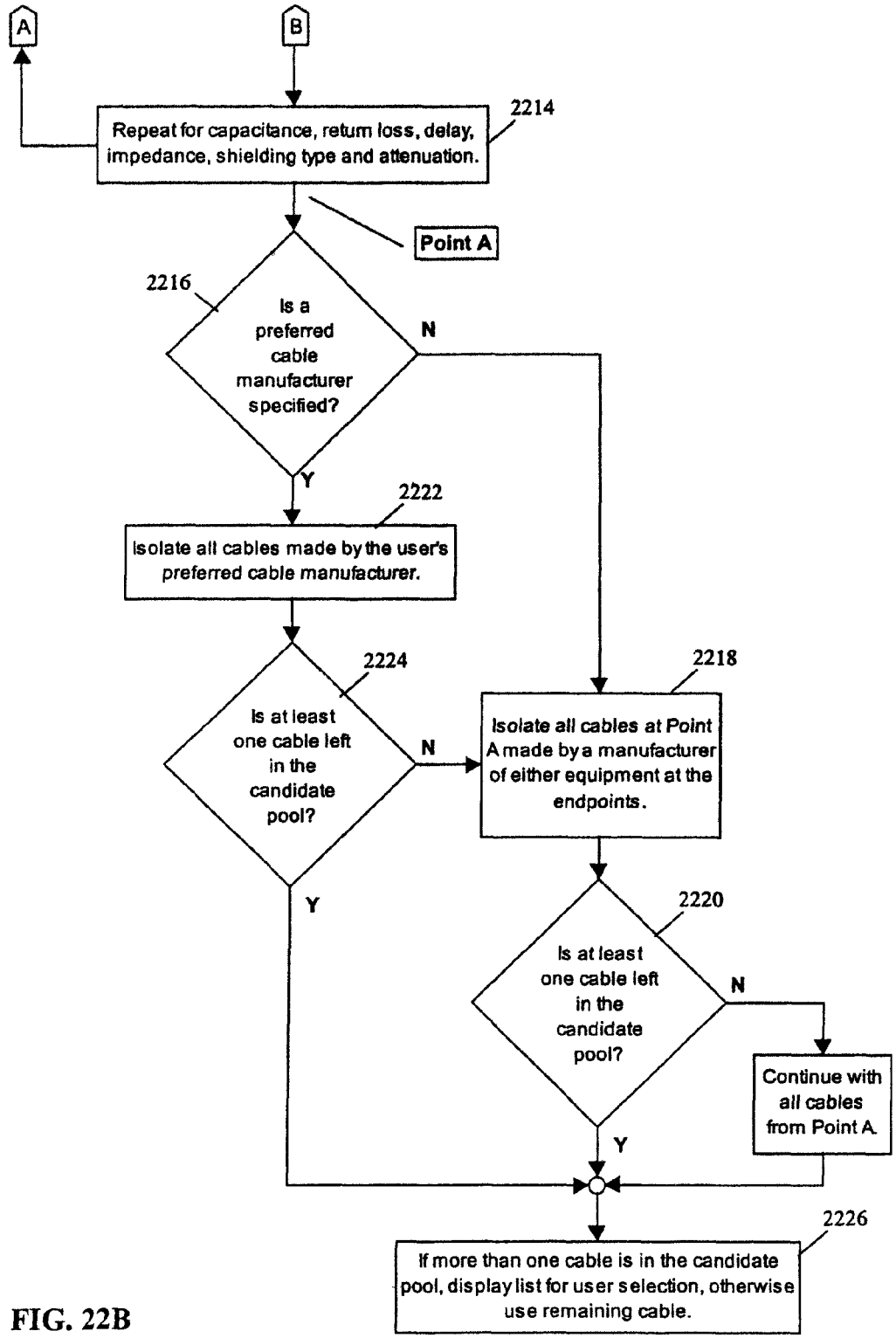

Cable Type
Diameter
Diameter Unit
Length
Length Unit
Attenuation
Impedance
Capacitance
Return Loss
Delay
Shielding Type
Connector Types The process of determining the correct cable is a process of filtering the complete cable pool with appropriate filters until one or more valid cables is found. FIGS. 22A and 22B are flow diagrams illustrating cable selection in accordance with a specific embodiment of the present invention. Prior to utilizing the flowchart, a composite set of cabling specs must be generated for the connection endpoints. This composite set is then used in the cable determination process. The combining the two cabling specs from the endpoints into a superset spec generates the composite set of cabling specs. The specification items and the combing logic are listed and described below.

Cable Type—the cable type is the same at each endpoint
Minimum Diameter—use the larger of the two minimum values
Maximum Diameter—use the smaller of the two maximum values
Diameter Unit—ensure that the diameter units are reconciled if different
Minimum Length—use the larger of the two minimum values
Maximum Length—use the smaller of the two maximum values
Length Unit—ensure that the length units are reconciled if different
Impedance—the impedance values must be the same at the endpoints
Capacitance—use the more stringent requirement
Return Loss—use the more stringent requirement
Delay—use the more stringent requirement
Shielding Type—use the more stringent requirement
Attenuation—the attenuation is determined by taking the nominal transmit signal level at one endpoint and subtracting the nominal receive signal level at the other endpoint, and then dividing the result by the connection length. The calculation is repeated for the other direction in the case of duplex ports. The lower of the two attenuation values is used in the case of duplex ports. In the case of a duplex connection over separate cables, the lower attenuation value is used for both cables. An alternative approach is to use the specified minimum and maximum transmit/receive levels to obtain an attenuation range. This attenuation range is defined as:

$$\text{Attenuation Range} = (TX_{max} - RX_{max}) \text{ to } (TX_{min} - RX_{min})$$

In some cases the attenuation range starting point is greater than the attenuation range ending point. This is usually due to an error in transmit and/or receive signal level range specifications. The calculation is repeated for the other direction in the case of duplex ports. In the case of duplex ports and/or duplex connections over separate cables, the cabling must meet the minimum and maximum attenuation requirements of both directions.

At 2200, all cables of the common cable type specified at the connection endpoints are isolated. At 2202, it is determined if at least one cable is left in the candidate pool. If not, then no cable is found. If so, at 2204 all cables with connectors that mate with the ones specified at the connection endpoints are isolated. Then, at 2206 it is determined if there is at least one cable left in the candidate pool. If not, at 2208 it is determined if an adaptor is available for either of the endpoints. If no, then no cable is found. If at 2208 it is determined that an adapter is available for either of the endpoints, the process iterates back up to 2204. If at 2206, it was determined that at least one cable was left in the candidate pool, at 2210 all cables with diameters within the minimum and maximum values of the composite cabling specification are isolated. Then, at 2212 it is determined if there is at least one cable left in the candidate pool. If not, then no cable is found. If so, then at 2214 the process cycles back up to 2210 for capacitance, return loss, delay, impedance, shielding type, and attenuation checking.

Once the cycles are complete, at 2216 it is determined if a preferred cable manufacturer is specified. If not, then at 2218 all cables available after 2214 made by a manufacturer of either equipment at the endpoints are isolated. At 2220, it is determined if at least one cable is left in the candidate pool. If not, then there is no manufacturer-preferred cable available and the process simply continues with all cables available after 2214 as the candidate pool. If at 2216 a preferred cable manufacturer was specified, at 2222, all cables made by the user's preferred cable manufacturer are isolated. Then at 2224, it is determined if at least one cable is left in the candidate pool. If not, then the preferred manufacturer cannot be chosen and the process continues from 2218.

Finally, at 2226, if more than one cable is left in the candidate pool, the list may be displayed for user selection. If only one cable is left, that is simply used without user intervention.

7. Converters:

A converter is an equipment item that converts or modifies any or all of the following parameters—protocol, signal, cable type and connector. Each converter may be modeled with the following items.

Converter ID—A unique identifier for the converter

Product/Part ID—The Product or Part ID for the converter as determined by the Model Type Code below Model Type Code—Specifies if the converter is modeled as a complete product of a simple part. A converter must be modeled as a complete product when it is more than just a simple part. This would be the case if the converter has power requirements or has additional configuration options.

Display Flag—Specifies if the converter should be displayed to the user. This is usually necessary when the converter has additional configuration requirements or options and only applies if the converter is modeled as a complete product.

Protocol A—The protocol type at side A of the converter.

Protocol B—The protocol type at side B of the converter.

Signal A—The signal type at side A of the converter.

Signal B—The signal type at side B of the converter.

Cable Type A—The cable type at side A of the converter.

Cable Type B—The cable type at side B of the converter.

Connecter A—The connecter type at side A of the converter.

Connecter B—The connecter type at side B of the converter.

Side A Interface Code—Specifies the connecter interface at side A (cable only, direct mating only, both but preferring cable and both but preferring direct mating)

Side B Interface Code—Specifies the connecter interface at side B (cable only, direct mating only, both preferring cable and both preferring direct mating)

Maximum Direct Mating Code—Specifies the maximum number of direct mating interfaces (none, one, one preferring A side, one preferring B side and two)

Direction Code—Specifies the directionality of the converter (A to B only, B to A only or bi-directional).

Figure 23:
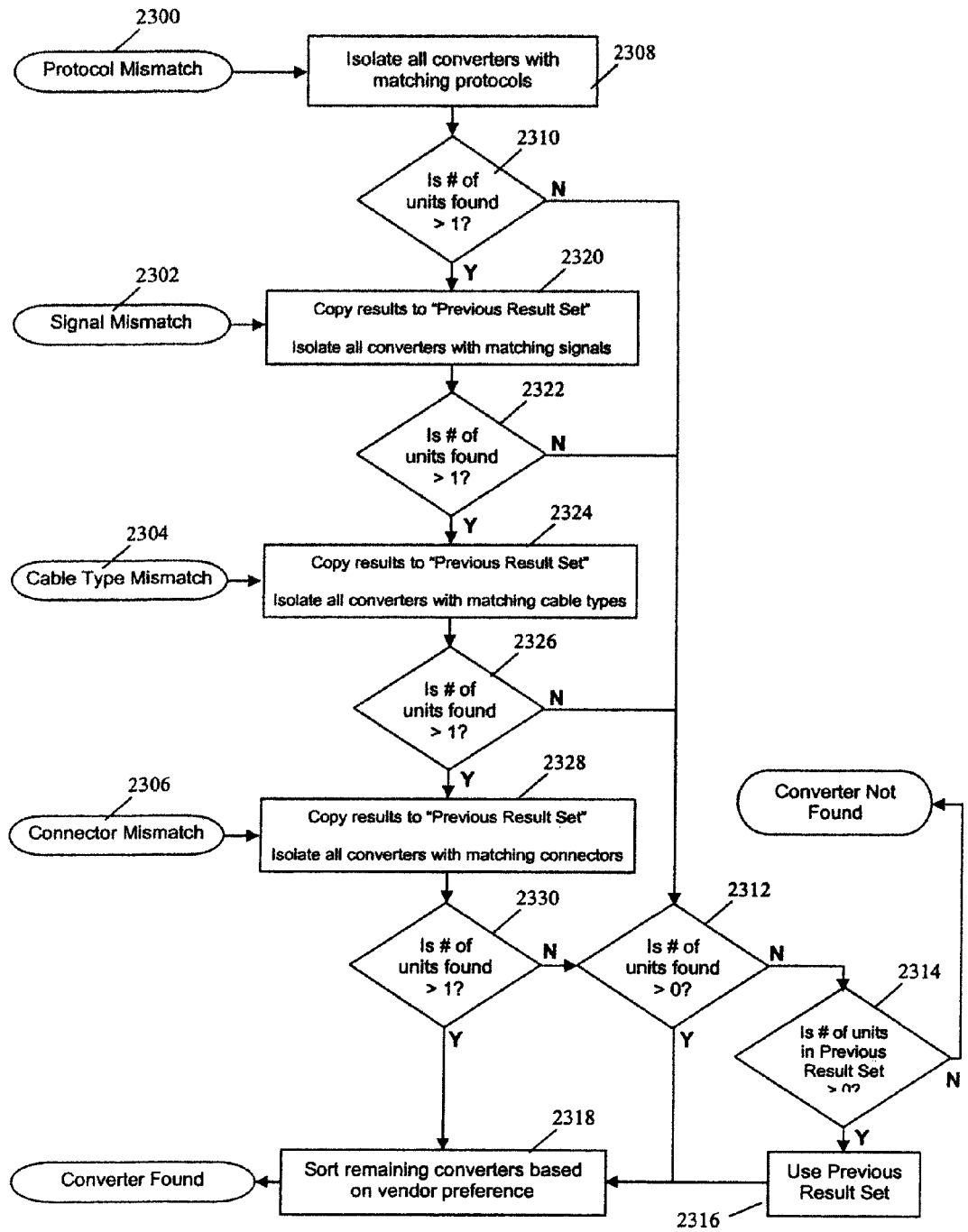
FIG. 23 is a flow diagram illustrating converter selection in accordance with a specific embodiment of the present invention.

The Interface Codes and Maximum Direct Mating Code enable the modeling of converters that can attach or mate directly on an equipment port without the need for an interconnecting cable. During the interconnection and cable selection processes when certain differences occur between parameters at the connection endpoints, converters are used to bridge that gap. The search for an appropriate converter not only needs to resolve the difference at the endpoints, but also must try not to introduce other differences at the same time. For example, in finding a converter to connect two differing signal types, the converter should not introduce differences in cable types or connectors, if possible. FIG. 23 is a flow diagram illustrating converter selection in accordance with a specific embodiment of the present invention. One should note that the selection process does allow the selection of converters that cause additional differences. This is a last resort and is necessary in order to allow for the utilization of more than one converter in the end-to-end difference resolution process. The entry point for the flow diagram will vary based on what mismatch needs to be remedied, protocol mismatch 2300, signal mismatch 2302, cable type mismatch 2304, or connector mismatch 2306. At 2308, all converters with matching protocols are isolated. At 2310 it is determined if the number of units found is greater than one. If not, then at 2312 it is determined if the number of units is greater than zero. If not, then at 2314 it is determined if the number of units in the previous result set is greater than zero. If not, then no converter is found. If at 2314 it was determined that the number of units in the previous result set was greater than zero, then the previous result set is used at 2316 and the remaining converters are sorted based on vendor preference at 2318. If at 2312 it was determined that the number of units found was greater than zero, then the process moves to 2318.

If at 2310 it was determined that the number of units was greater than one, at 2320 the results are copied to the previous result set and all converters with matching signals are isolated. Then at 2322 it is determined if the number of units found is greater than one. If not, the process moves to 2312. If so, at 2324 the results are copied to the previous result set and all converters with matching cable types are isolated. Then at 2326, it is determined if the number of units found is greater than one. If not, the process moves to 2312. If so, at 2328, the results are copied to the previous result set and all converters with matching connectors are isolated. Then at 2330, it is determined if the number of units found is greater than one. If not, the process continues to 2312. If so, the process continues to 2318.

D. Racking Process

Racking is the process of placing equipment on racks or within containers such as cabinets. A mechanism may be required to validate that equipment placement guidelines are enforced. Reasons for such guidelines include space allocation for heat dissipation and proper placement to respect cabling constraints such as length and routing. The process of enforcing these guidelines is based on an enhanced template approach. This approach has the following benefits:

Configuration sensitive racking—Allows for templates to be constructed where product positioning on the template is dependent on the object's configuration or other factors.

Tagging optional items in the template—Allows for templates that contain objects that may be tagged as optional. This allows for a subset of objects to be racked using the template.

Allocation of "Dead Space"—space that cannot be used for other products, even after the racking process is completed.

Template merging—Allows for templates to be merged in order to handle a product mix which was not considered when the templates were first created.

1. Rule Encoding

Figure 24:
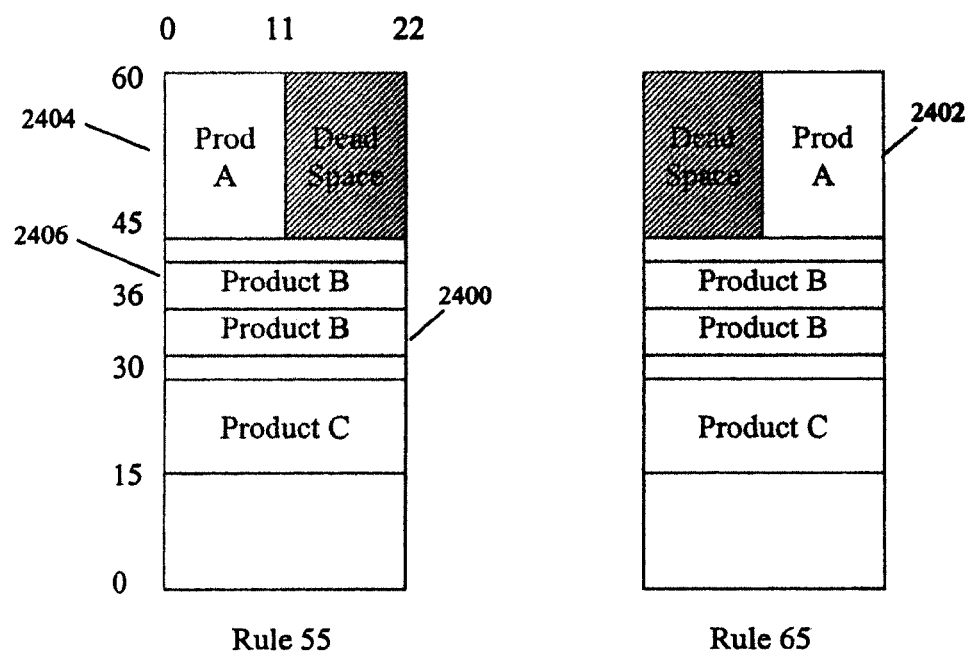
FIG. 24 is a diagram illustrating an example of how rule encoding may be used in the racking process in accordance with a specific embodiment of the present invention.

The encoding of these templates requires the following items:

1. Rule ID—unique ID per template
2. Item ID—unique ID per item in the template
3. Product ID—product identifier
4. Optional Flag—flags the item as optional meaning that it may be dropped from the template if necessary to complete a match
5. Mounting Code—specifies special mounting conditions, valid codes are 1=on rack (default), 2=outdoor, 3=floor, 4=desktop
6. Condition—condition written in the defined rule engine syntax
7. Vertical Start (VP1)—starting vertical position relative to container bottom
8. Vertical End (VP2)—ending vertical position relative to container bottom
9. Horizontal Start (HP1)—starting horiz position relative to container left
10. Horizontal End (HP2)—ending horiz position relative to container left
11. Parent Item ID—Item ID of the parent of/for this item FIG. 24 is a diagram illustrating an example of how rule encoding may be used in the racking process in accordance with a specific embodiment of the present invention. In this example, Product B 2400, which is located at position 30 on the rack, is optional and is not required for the utilization of the template. The use of the condition to specify configuration sensitivity is shown in how Product A would be racked. In the case where Product A 2402 is configured as "Right Mount" the template described in Rule 65 would be used for racking. Upon racking, dead space is created and associated with the product specified as the parent. After racking, the dead space would stay associated with that product, occupying space on the rack, thus not allowing other products to occupy that space. Because the dead space is associated with Product A, the dead space requirement is eliminated from the rack whenever Product A is un-racked or deleted. The Mounting Code is not shown in this example but is 1 for all entries.

| Rule ID | Item ID | Product | Opt | Condition | VP1 | VP2 | HP1 | HP2 | Parent |
|---|---|---|---|---|---|---|---|---|---|
| 55 | 1 | A | 0 | $PROP2$="Left Mount" | 45 | 60 | 0 | 11 | 0 |
| 55 | 2 | B | 0 | | 36 | 42 | 0 | 22 | 0 |
| 55 | 3 | B | 1 | | 30 | 36 | 0 | 22 | 0 |
| 55 | 4 | C | 0 | | 15 | 26 | 0 | 22 | 0 |
| 55 | 5 | Dead Space | 0 | | 45 | 60 | 11 | 22 | 1 |
| 65 | 1 | A | 0 | $PROP2$="Right Mount" | 45 | 60 | 11 | 22 | 0 |
| 65 | 2 | B | 0 | | 36 | 42 | 0 | 22 | 0 |
| 65 | 3 | B | 1 | | 30 | 36 | 0 | 22 | 0 |
| 65 | 4 | C | 0 | | 15 | 26 | 0 | 22 | 0 |
| 65 | 5 | Dead Space | 0 | | 45 | 60 | 0 | 11 | 1 |

The condition aspect of the racking rules is also very important in resolving confusion within the template. For example, assuming that in the diagram above, Product B 2406 located at position 36 must be connected to port 1 on Product A 2404 in order to occupy that location. And Product B 2400 located at position 30 must be connected to port 3 on Product A 2404 in order to occupy that location. This requirement can be codified in the conditions of both B products as shown below.

Product B at position 36 Condition: $SELF$~$RACKMATE1.PORT1$

Product B at position 30 Condition: $SELF$~$RACKMATE1.PORT3$

The $SELF$ token is required in these rules because rule syntax requires an item on the left side of the logic statement. If the requirement was that a particular port on Product B must be connected to Product A, then the condition could have been written without the $SELF$ token as in $PORT5$~$RACKMATE1.PORT1$.

2. Rule Implementation

The encoded template rules are utilized in the following two scenarios:

Automatic Group (1-n) Racking—In this case the user selects a group of equipment and requests that they be automatically racked. The user can control how the racking process works with the following options
Utilize new racks only
Utilize existing racks only
Utilize existing racks if possible, then new racks for the remaining items Manual Racking—in this scenario, the user selects and drags an object onto a rack for racking. The process validates that the user's drop location is valid in terms of space constraints and template matching. The user has the option of disabling template matching in manual racking process. In this case, the process ensures that the size of the drop location area is adequate for the object.

Figure 25A:
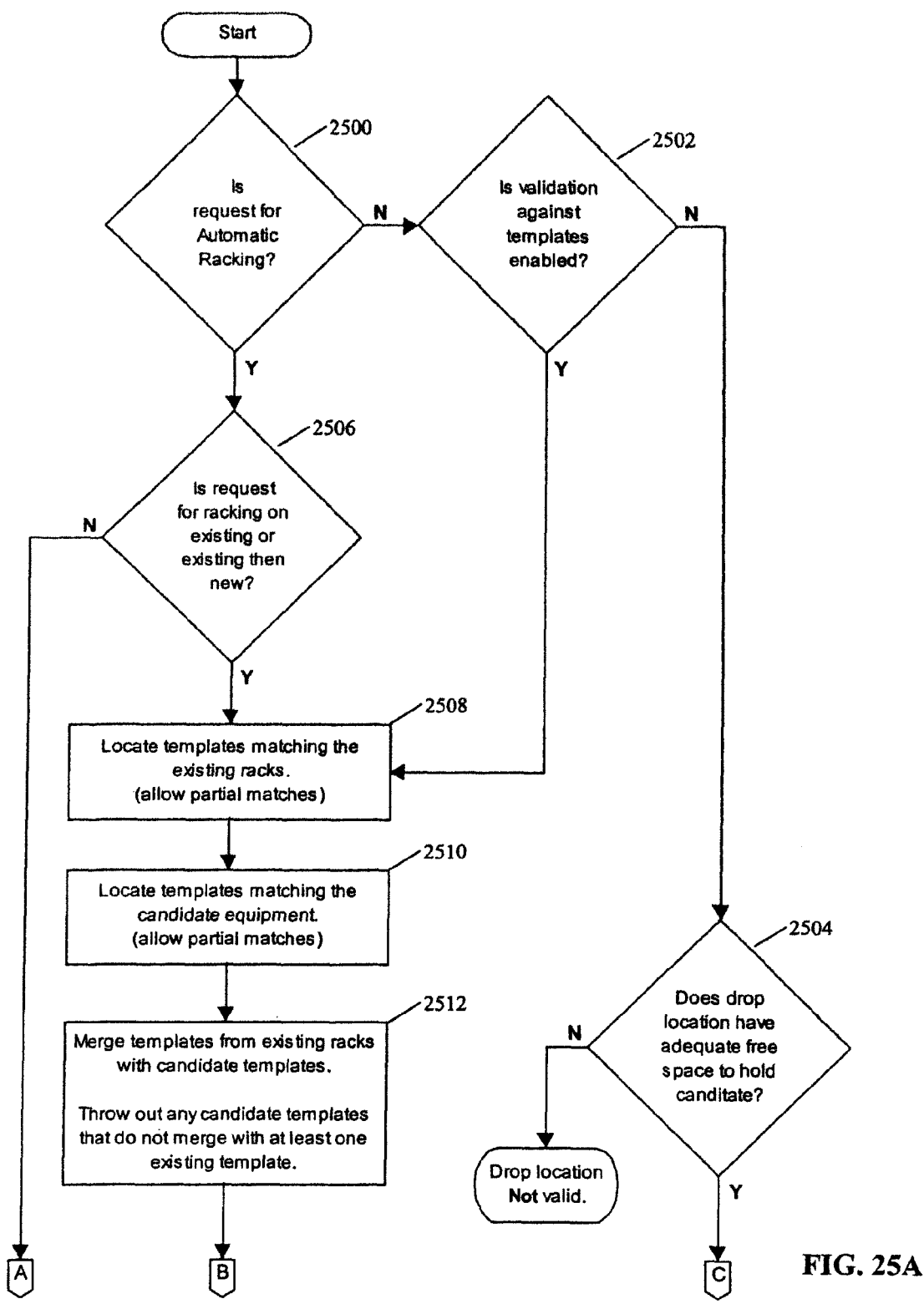
FIGS. 25A and 25B are flow diagrams illustrating automatic and manual racking in accordance with a specific embodiment of the present invention.
Figure 25B:
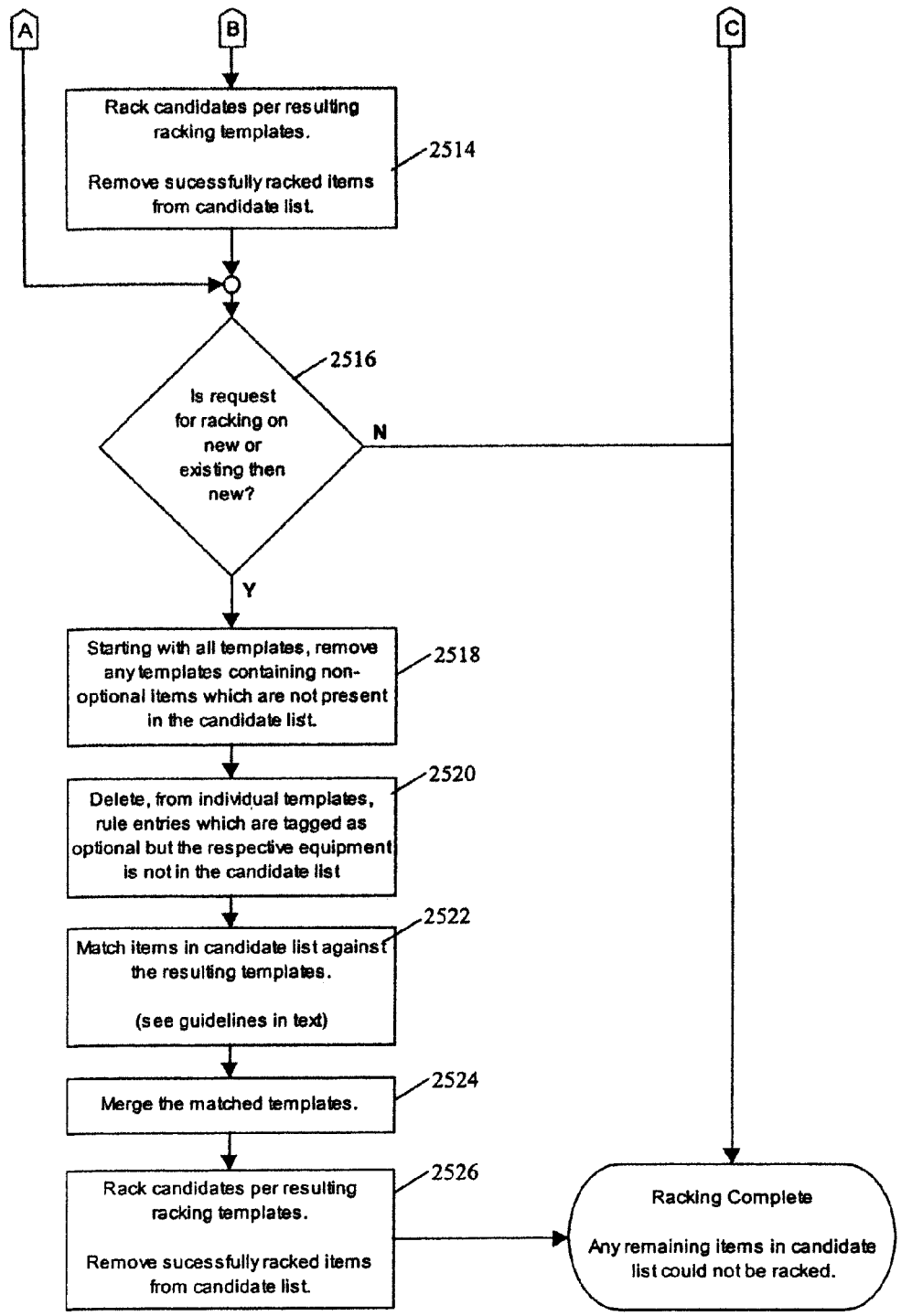

FIGS. 25A and 25B are flow diagrams illustrating automatic and manual racking in accordance with a specific embodiment of the present invention. The template merge and template matching functions, which are key steps in the racking process flow, are described in detail after the flow diagrams. At 2500, it is determined if a request is for automatic routing. If not, at 2502 it is determined if validation against templates is enabled. If it is not, then at 2504 it is determined if the drop location has adequate free space to hold the candidate. If not, the drop location is not valid. If at 2504 it was determined that the drop location does not have adequate free space to hold the candidate, then the racking is complete and any remaining items in the candidate list cannot be racked. If at 2500 it was determined that there was a request for automatic routing, at 2506, it is determined if the request for racking is on existing or existing then new. If so, the process moves to 2508, where templates matching the existing racks are located. 2508 is also reached if at 2502, it is determined that validation against templates is enabled. Then at 2510, templates matching the candidate equipment are located. At 2512 the templates from existing racks are merged with candidate templates and any candidate templates that do not merge with at least one existing template are thrown out. Then at 2514, candidates are tacked per the resulting racking templates and any successfully racked items are removed from the candidate list.

At 2516, it is determined if there is a request for racking on new or existing then new. If not, racking is complete and any remaining items in the candidate list cannot be racked. If so, the process moves to 2518. 2516 is also reached if at 2506 it was determined that there was a request for racking on existing or existing then new. At 2518, starting with all templates, any templates containing non-optional items which are not present in the candidate list are removed. Then at 2520 rule entries are deleted from individual templates which are tagged as optional but where the respective equipment is not in the candidate list. At 2522, items in the candidate list are matched against the resulting templates. At 2524, the matched templates are merged. At 2526, candidates are racked per the resulting racking templates and any successfully racked items are removed from the candidate list. Then racking is complete and any remaining items in the candidate list cannot be racked.

3. Template Merge

The process of merging templates involves the creation of composite templates based on one or more original templates. The process steps are detailed below.

1. Sort the original templates in descending order based on the number of equipment objects per template (defined as Template Pool)
2. Outer Loop: I=1 to Last template in Template Pool
3. Inner Loop: (loop direction depends on preference setting)
   a. J=1 to Last template in Template Pool or
   b. J=Last template in Template Pool to 1
4. Skip I=J
5. Compare templates I and J for any overlaps in object position rectangles, ignoring overlaps between the same equipment objects at the identical position
6. If no overlaps are found
   a. Combine the two templates into one template
   b. Delete the two original templates from the Template Pool
   c. Add the new template to the Template Pool
   d. Repeat the process starting with the sorting in Step 1
7. If any overlap is found then move to the next item J in the Inner Loop and repeat Steps 4-7
8. If all items in Inner Loop are processed, move to the next item in Outer Loop and repeat Steps 3-8
9. When all items in the Outer and Inner Loops are complete, the templates in remaining in the Template Pool are now merged The inner loop is designed to work in both directions. Switching the direction of the inner loop leads to different results in terms of how much consolidation or merging occurs. The recommended merge process would run the merge in two phases, one with the inner loop in the top-down direction and then with the inner loop in the bottom-up direction. The results of the phase where the most consolidation had occurred would be retained. The choice of top-down only, bottom-up only or both is controlled by the software setup/settings and is in part decided by the performance of the hardware and the user's expectation of the merge results.

4. Template Matching

In order for equipment racking to occur, a racking template must be matched. All individual non-optional items on a template must correspond to items in the candidate list for the template to be considered a match. This process is demonstrated with the following example. The candidate list is a selection of equipment to be racked.

| Candidate List: | Products A, B, C, X, Y and Z |
|---|---|
| Template 1: | Products A, C, Z |
| Template 2: | Products A, C, M |
| Template 3: | Products A, C, N (optional), X |

The candidate list above would match template 1 because all products in the template exist in the candidate list. Template 2 would not be a match because product M is not in the candidate list while template 3 would be a match because product N is tagged as optional and does not need to be in the candidate list.

Template matching must also validate condition statements that may be specified in the racking templates. For example if condition statement for product Z in template 1 specified that the product must be configured a certain way or that the product must be interconnected with another specific product, a match would not occur unless the specified condition was met by the equipment in the candidate list.

One of the goals in template matching is to minimize the number of racks required to host the candidate list. This goal is achieved by attempting to match with templates that contain the highest number of products. Therefore prior to the matching process all templates are ranked in descending order based on the number of products.

Another goal in matching templates is to place interconnected and/or related equipment on the same rack. Racking and placement that is dependant on specific connections is already handled with the use of the condition part of the template rules. This goal of template matching deals with the general issue of cabling. The benefits of achieving this goal are to minimize cable lengths and reduce the cabling "spaghetti" that will occur if equipment is randomly mounted on racks. Adhering to following guidelines in the template matching process helps to alleviate these problems.

Parent/Child Relationship—objects that are linked together via a parent child relationship should be grouped together on the same rack.

Number of Connections—objects that a linked with a higher number of interconnections should be grouped together on the same rack.

Connection Type—objects that are interconnected with "Internal" connection types should be grouped together on the same rack

E. Quote Generation

The process of generating a quotation involves the collection of the parts, costs and prices from the various repositories, rule based engines and lookup tables. Quotations are typically generated for a design effort and are usually broken down to the site level (some items are not associated with a specific site and are therefore shown at the design effort or system level). Optionally, the quotation may consolidate all of the items together without the per site groupings. The following process for the compilation of the quotation is listed and described in the required order.

1. Parts
    Include part number, description and quantity for each product
    Include the part number generated through Smart Part Number process
    Include parts and quantities per the $1^{st}$ tier part inclusion rules
    Include parts and quantities per the $2^{nd}$ tier part inclusion rules
    Include cables and converters generated via the custom and dynamic connection processes
2. Include user selected product accessories
3. Include user selected test equipment
4. Include spares (see Spares Engine section)
5. Include items specified in the per site and/or system level addendums.
6. Include price per the parts table lookup (adjust price based on currency code) and account for parts "included in mainline". Parts that are included in mainline are parts whose price and cost is embedded in the mainline part and are listed separately only to provide additional detail on the quotation.
7. Include price using Smart Part Number logic (adjust based on currency code)

Two types of quotations are supported—a consumer version and a seller/re-seller version. The seller version provides, in addition to the above, support for costing, discounting and other customization features such as customer details, terms and conditions and control of output layout and format.

1. Part Inclusion Rules

In general a product may consist of one or more parts. Some of these parts may form the product core while other parts may be optional. The product model and the part inclusion rules govern which parts and when a specific part is included. The product model defines parts that are makeup the basic product package and thus are always included. The part inclusion rules specify the conditions under which optional or configuration specific parts are included.

The part inclusion rules are encoded using condition and effect statements for each optional part. These parts are associated with a top-level product as defined in the product model. Part inclusion rules are grouped in 2 tiers, with the $2^{nd}$ tier reserved for encoding part inclusion rules that depend on the results of the tier one rules. Both forms are structured in the same way with the only exception is that the $2^{nd}$ tier rules are executed after all the $1^{st}$ tier rules are completed. The $2^{nd}$ tier rules allow the accurate addition of parts in situations such as 1:N and 1:1 standby protection. An example of these rules is shown below.

| Product ID | Part ID | Rule ID | Tier | Condition | Quantity Effect |
|---|---|---|---|---|---|
| 23 | 725 | 1 | 1 | $PROP7$="Basic" | $PROP6$/4 |
| 23 | 727 | 2 | 1 | $PROP7$="Upgraded" | $PROP6$/6 |
| 23 | 725 | 3 | 2 | $PROP8$="1:1 Standby" | $QUANTITY$ |
| 23 | 727 | 4 | 2 | $PROP8$="1:1 Standby" | $QUANTITY$ |

Product 23 is configured with the following

| | |
|---|---|
| Property 6, "Number of Channels" = | 12 |
| Property 7, "Channel Type" = | Basic |
| Property 8, "Channel Protection Type" = | 1:1 Standby |

In the example rules, Part ID 725 is a basic channel plug-in card with 4 units/card and Part ID 727 is the upgraded channel plug-in card with 6 units/card. The $QUANTITY$ code in the effect column signifies the current quantity of the part associated with that rule. When the rules are executed the Tier 1 rules would add part 725 with a quantity of 3 cards per Rule ID 1. The effect statement determines the quantity by calculating $PROP6$/4 or 12/4=3. The Tier 2 rules would add part 725 with a quantity of 3 cards per Rule ID 3. Again the effect statement determines the quantity by adding $QUANTITY$ or 3 units. The total on the quotation would be 6 cards of Part ID 725. Even thought Rule ID 4 is valid and is executed the effect adds the then known quantity of part ID 727, zero to the quotation.

F. Spares Engine

The proper sparing of a product is a complex process that requires an understanding of the relationship between spares and a product's configuration. The proper determination of type and quantity of spares is critical to meeting the end user's budget and risk tolerance. The following details a mechanism in which these issues are addressed. The spares engine requires the following data about the each product and its spares. MTTR is defined as the unit's repair time and not the time to restore operation.

Basic Reliability Data: Each part (spare part and whole product) is assigned base values of MTBF, MTBO and MTTR.

Spare Inclusion Rules: These rules assign spares (and quantity) to a product based, if necessary, on the product's configuration. Spares are linked to a product that requires spares with the following data.
    Product ID—the unique product identifier
    Part ID—the unique part identifier for this spare
    Inclusion Rule—Specifies a required product configuration under which this part is assigned as a spare. If the spare's inclusion is not configuration dependent, then the rule is set to "1" which always evaluates to true.
    Quantity Rule—The quantity of this part. This rule component is used to allow part quantities that build on configuration parameters.
    Protection State—the protection state or protection type of the part that is being spared. This state is defined with 0=not protected, 1=parallel protection, 100+n=1 for n, 200+n=2 for n etc.

Product Reliability Rules: These rules provide a mechanism that adjusts a product's MTBF, MTBO and MTR values based on the product's configuration. These rules have the following parts.
    Product ID—the unique product identifier
    Rule ID—the unique identifier for this rule Condition—a condition statement which must evaluate to true in order to make the adjustments MTBF Change—the MTBF adjustment value MTBO Change—the MTBO adjustment value MTTR Change—the MTTR adjustment value The spares engine also requires the following user specified parameters.

Equipment Sparing Factor—a value in the range of 0-100 where zero does not provide any spares and 100 provides all spares (this setting is usually dependent on cost and risk tolerance factors)

The choice of using MTBO or MTBF in the analysis. The term "MTBx" will be used to mean either MTBF or MTBO depending on the user's selection.

The choice of considering or ignoring the protection state of part being spared

The process for determination of the spares for a product is as follows.

1. The product's MTBx is adjusted based on the product's configuration per the Product Reliability Rules
2. A set of possible spares (candidates) and quantities is determined per the Spare Inclusion Rules (which may depend on the product's configuration)
3. Each candidate's base MTBx is retrieved from the product model
4. If the user has selected to consider the protection state then each candidate's base MTBx is adjusted as necessary per the protection state setting. For example the base MTBx is not changed for a setting of 0 or not protected and the base MTBx is multiplied by 1.5 for a setting of 1 or parallel protection.
5. A sparing factor for each candidate is calculated per the following equation.

Sparing Factor=Configured Product MTBx/Candidate MTBx

6. A candidate is added to the final spares list if its calculated sparing factor is greater than or equal to the user specified Equipment Sparing Factor.

In cases when sparing more than one equipment item, the overall spares list may contain duplicate parts. A user may wish to consolidate these spares to eliminate the redundancy. This consolidation may be done at the site or system level depending on how spares will be deployed by the user. The consolidation algorithm embodies the following concepts.

At least one of each spare is retained

A higher quantity is retained if the spare is more likely to fail.

A higher quantity is retained if the spare is sparing more equipment.

Figure 26:
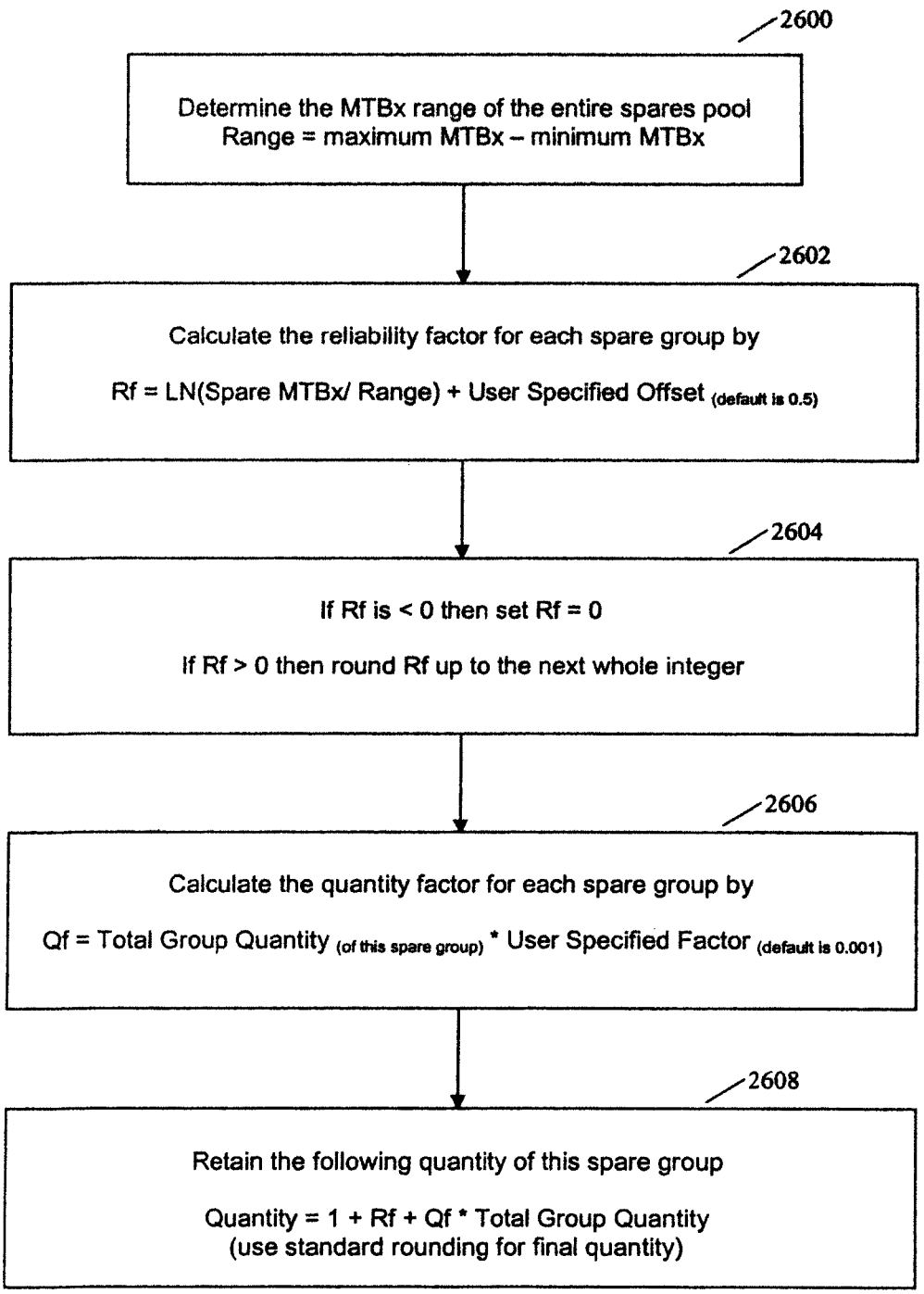
FIG. 26 is a flow diagram illustrating spares consolidation in accordance with a specific embodiment of the present invention. The spares pool is defined as the identified spares prior to consolidation and a spare group is the set of identical or duplicate spare parts.

The algorithm achieves item two by a logarithmic weighting of the part's MTBx and item 3 by a linear weighting based on the number of times the part was requested. Both of these weighting factors are adjustable by the user. FIG. 26 is a flow diagram illustrating spares consolidation in accordance with a specific embodiment of the present invention. The spares pool is defined as the identified spares prior to consolidation and a spare group is the set of identical or duplicate spare parts. At 2600, it is determined if the MTBx range of the entire spares pool range equals maximum MTBx minus minimum MTBx. At 2602, the reliability factor for each spare group by Rf=LN (Spare MTBx/Range)+User Specified Offset (default of 0.5). At 2604, if Rf<0 then Rf is set to 0, while if Rf>0 then Rf is rounded up to the next whole integer. At 2606, the quantity factor for each spare group is calculated by Qf=Total Group Quantity (of the spare group)*User Specified Factor (default of 0.001). Finally, at 2608, the quantity of the spare group is retained, wherein the quantity=1+Rf+Qf*Totl Group Quantity (with standard rounding used for the final quantity). Then 2602-2608 of the process are repeated for each spare group.

V. Support Functions

Support functions are an associated group of features that enable rapid system design by reducing the repetitive aspects of creating and configuring equipment. These functions are copy/paste configuration, across-the-board configuration and equipment/connection templates.

A. Copy/Paste Configuration

Figure 27:
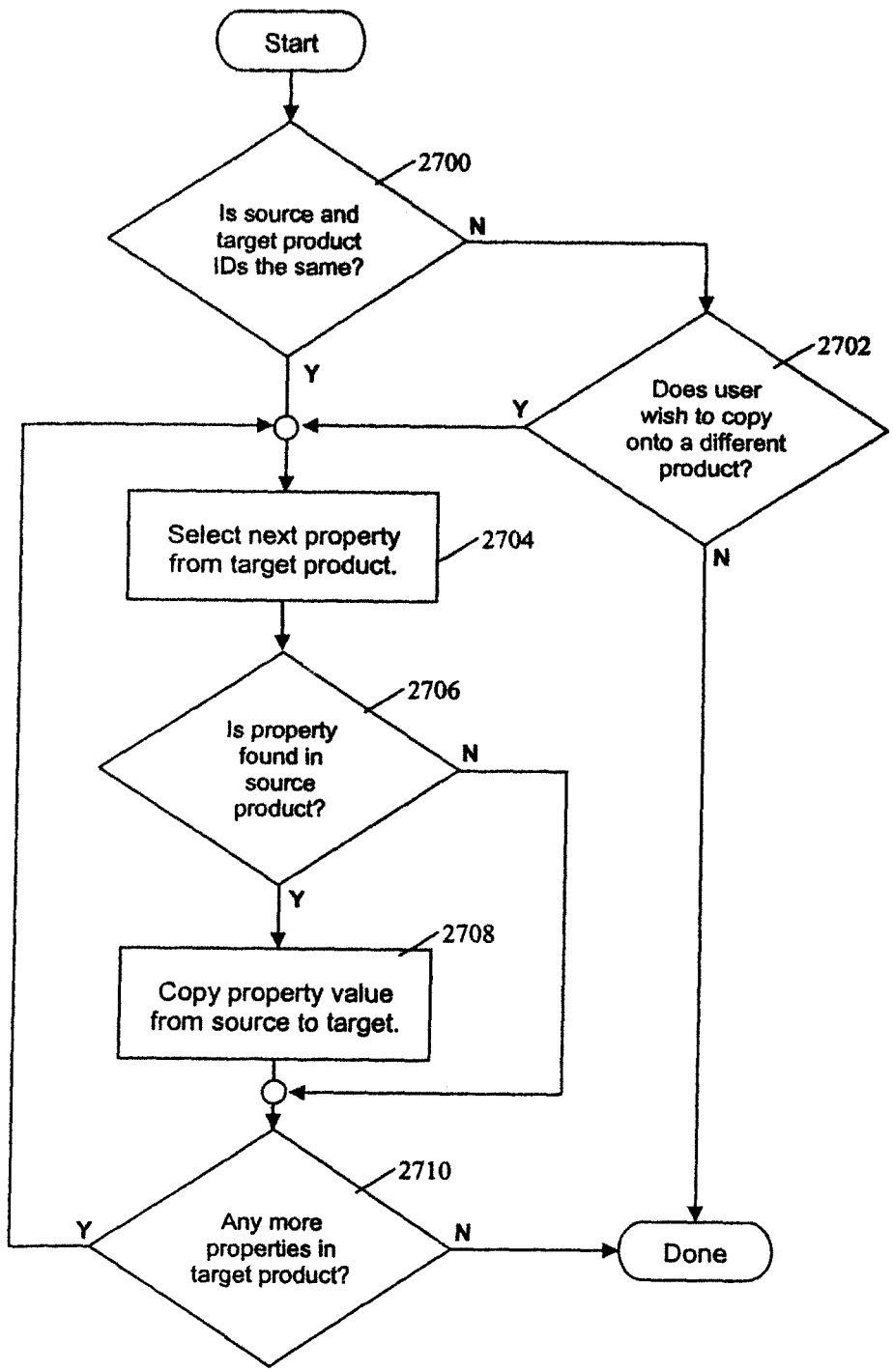
FIG. 27 is a flow diagram illustrating paste configuration in accordance with a specific embodiment of the present invention.

The copy aspect of this feature allows a user to select a partially or completely configured object and copy its configuration. The user can then select one or more objects and apply or paste that configuration on the selected objects. The copy step is accomplished by storing the product identifier, its properties and the respective property values. The temporary store for this data may be in computer memory or on computer disk. FIG. 27 is a flow diagram illustrating paste configuration in accordance with a specific embodiment of the present invention. At 2700, it is determined if the source and target product ID is the same. If not, at 2702, it is determined if the user wishes to copy onto a different product. If not, the process ends. If so, at 2704 the next property is selected from the target product. 2704 may also be reached if at 2700 it was determined that the source and product IDs were the same. At 2706 it is determined if the property is found in the source product. If so, at 2708 the property value is copied from source to target. At 2710, it is determined if there are any more properties in the target product. If not, the process is done. If so, the process repeats at 2704.

B. Across-the-Board Configuration

The across-the-board configuration feature allows a user to apply configuration changes made to one object across all similar objects. This function is basically a Copy/Paste Configuration that is applied to all similar objects. The copy step is identical to the copy step described in the Copy/Paste Configuration. The application step is also the same as described in the Copy/Paste Configuration but this step is repeated across all equipment with the same product identifier within the specified scope. The application scope may be set to the open site, a group of sites, the design effort or the entire system.

C. Equipment/Connection Templates

Templates allow a user to select a group of objects and connections and then create a template that contains the objects, their respective configuration information and connections. When this template is used or applied, the saved equipment (with configurations) and connections are re-created (pasted) at the specified location. These templates support the creation/application of "loose" connections. Loose connections are connections between an equipment item in the template and one not in the template. Loose connections are also connections between two equipment objects neither of which are in the template. Templates can be named and saved for later retrieval and use. Templates are stored in XML format thus allowing the sharing of templates between users at the same installation and with some restrictions users at different installations. Equipment manufacturers and others may create templates to show preferred equipment configurations and/or connectivity. Templates may also be created to show example or starter designs. These templates can be made available through various means including the Internet.

The XML format for the template is shown below.

```
<Template>
    <TemplateID></TemplateID>
    <Label></Label>
    <Creator></Creator>
    <DateTime></DateTime>
    <Equipment>
        <CreateFlag></CreateFlag>
            .
            .   (Additional detail omitted for clarity)
            .
        <Property>
            .
            .   (Additional detail omitted for clarity)
            .
        </Property>
        <Port>
            .
            .   (Additional detail omitted for clarity)
            .
        </Port>
    </Equipment>
    <Connection>
        .
        .   (Additional detail omitted for clarity)
        .
    </Connection>
    <Accessory>
        .
        .   (Additional detail omitted for clarity)
        .
    </Accessory>
</Template>
```

When a template is created all user-selected objects are encoded per the above format. Most of the elements in the format are self-explanatory with additional details provided in the Product Model and User System Model sections. The CreateFlag, which controls the creation of each equipment item, is key for the support of loose connections. When a user selects a connection for inclusion into a template, both equipment objects at the connection endpoints are loaded into the template as well. Any equipment object that was not originally selected by the user would have its CreateFlag set to zero otherwise the flag is set to 1.

When a template is applied, all equipment with a CreateFlag of one is created with their respective ports, properties and accessories. Connections specified in the template are then created. Creating these connections is straightforward when the template has also created the endpoint equipment. In cases where either of the connection endpoints is linked to equipment that was not created, the template creation process then attempts to find an existing equipment item that can serve as the connection point. The process of locating a suitable equipment object is based on comparing existing equipment with the original endpoint equipment object specified in the template. The following conditions must be met before a connection is made.

The target equipment's Product ID must match the original

The target connection port must be available for use (not connected, hidden or disabled)

The following user settings provide control over this process.

Option to block the attempt to re-connect loose/broken connections

Option to connect only when the target is identical in configuration to original In case of multiple suitable connection targets, the option to
 a. Not connect
 b. Connect with the closest target (based on configuration)
 c. Connect with the closest target (based on screen position)

Figure 28:
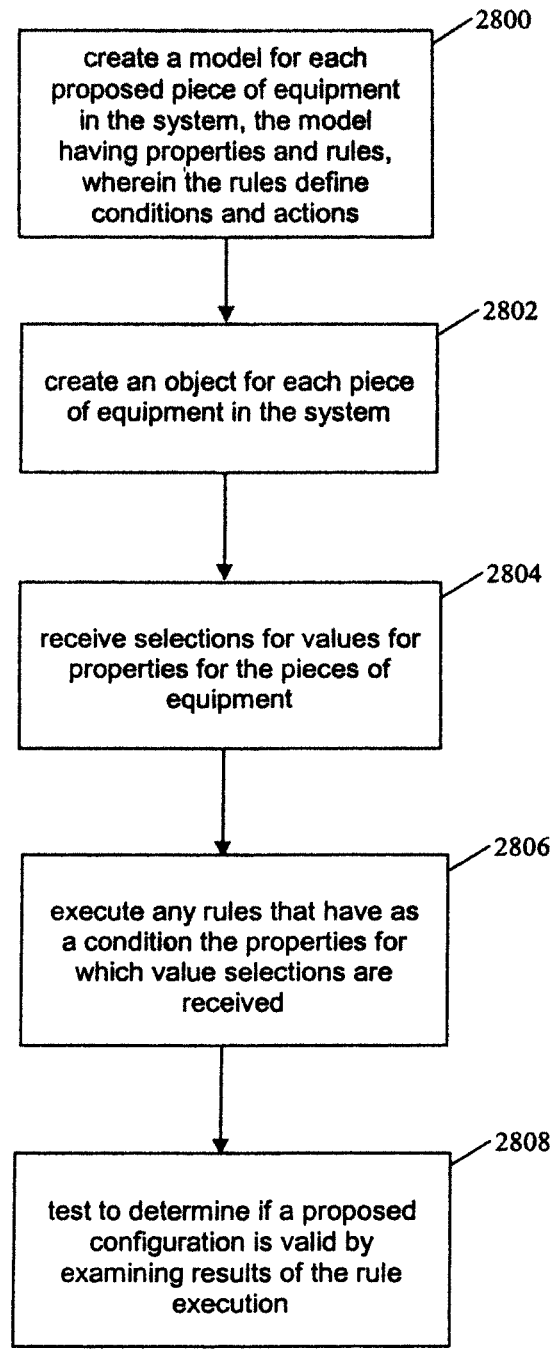
FIG. 28 is a flow diagram illustrating a method for configuring an equipment-based system for a user in accordance with a specific embodiment of the present invention.

FIG. 28 is a flow diagram illustrating a method for configuring an equipment-based system for a user in accordance with a specific embodiment of the present invention. At 2800, a model is created for each proposed piece of equipment in the system, the model having properties and rules, wherein the rules defined conditions and actions. The model may be created using an extensible markup language or a relational database. The model may partially comprise a smart part number. Each rule may have a condition statement and an effect statement, and the condition statement may have at least one variable token. Evaluating the condition statement may include replacing the variable tokens with their corresponding values. At 2802, an object is created for each piece of equipment in the system. At 2804, selections for values for properties for the pieces of equipment are received. These selections may be made by a user. At 2806, any rules that have as a condition the properties for which value selections are received are executed. The effects of these rules may be displayed to the user. At 2808, testing is undertaken to determine if a proposed configuration is valid by examining results of said rule execution.

Figure 29:
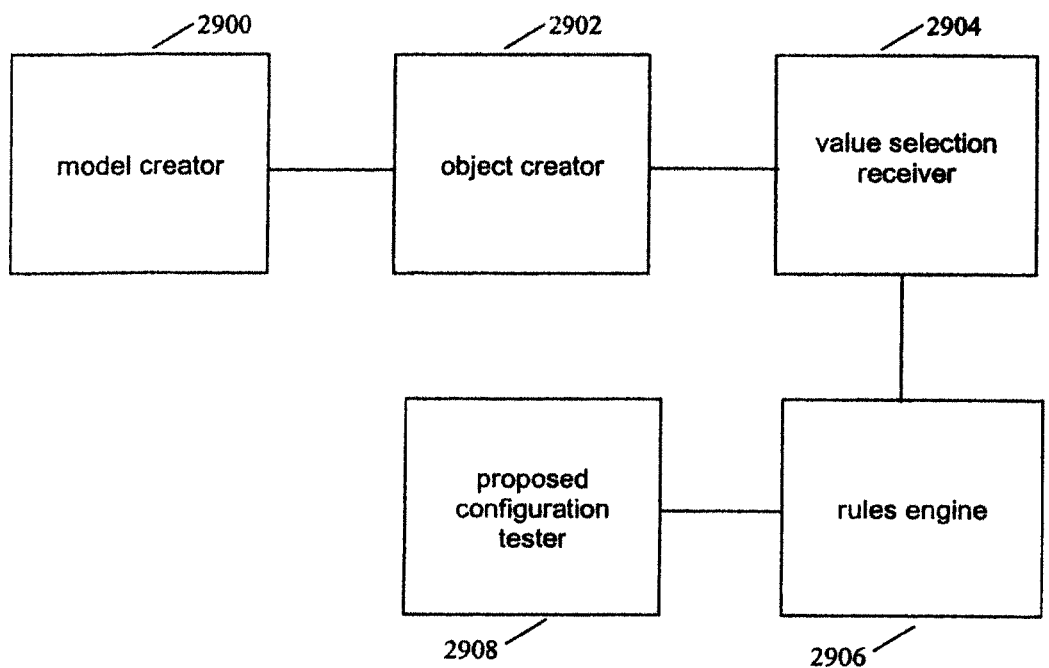
FIG. 29 is a block diagram illustrating an apparatus for configuring an equipment-based system for a user in accordance with a specific embodiment of the present invention.

FIG. 29 is a block diagram illustrating an apparatus for configuring an equipment-based system for a user in accordance with a specific embodiment of the present invention. A model creator 2900 creates a model for each proposed piece of equipment in the system, the model having properties and rules, wherein the rules defined conditions and actions. The model may be created using an extensible markup language or a relational database. The model may partially comprise a smart part number. Each rule may have a condition statement and an effect statement, and the condition statement may have at least one variable token. Evaluating the condition statement may include replacing the variable tokens with their corresponding values. An object creator 2902 coupled to the model creator 2900 may create an object for each piece of equipment in the system. A value selection receiver 2904 coupled to the object creator may receive selections for values for properties for the pieces of equipment. These selections may be made by a user. A rules engine 2906 coupled to the value selection receiver 2904 executes any rules that have as a condition the properties for which value selections are received. The effects of these rules may be displayed to the user. A proposed configuration tester 2908 coupled to the rules engine 2906 tests to determine if a proposed configuration is valid by examining results of said rule execution.

Figure 30:
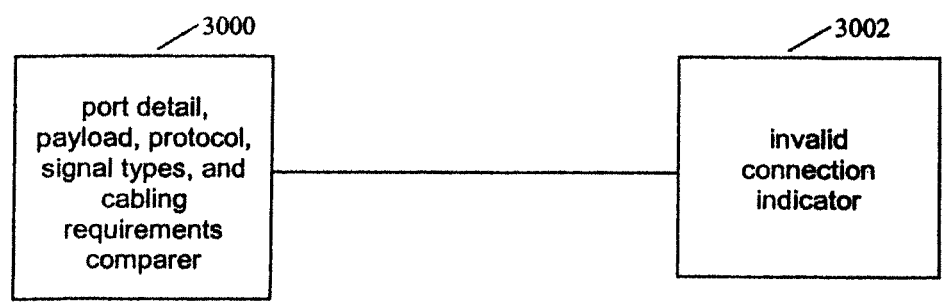
FIG. 30 is a block diagram illustrating an apparatus for adding a connection between pieces of equipment in a design of an equipment-based system, the pieces of equipment each having a model, in accordance with a specific embodiment of the present invention.

FIG. 30 is a block diagram illustrating an apparatus for adding a connection between pieces of equipment in a design of an equipment-based system, the pieces of equipment each having a model, in accordance with a specific embodiment of the present invention. A port detail, payload, protocol, signal types, and cabling requirements comparer 3000 compares port detail, payload, protocol, signal types, and cabling requirements in the model for each of the pieces of equipment. An invalid connection indicator 3002 coupled to the port detail, payload, protocol, signal types, and cabling requirement comparer 3000 indicates the connection is not valid if the ports at both end-points are available for connection. It also indicates the connection is not valid if a fixed connection rule is not available for the connection and the payload carried by both end-points is not compatible. It also indicates the connection is not valid if a fixed connection rule is not available for the connection, the protocol and signal type carried by both endpoints is not compatible, and a converter is not available to bridge the gap between the incompatible protocol and/or signal types. It also indicates the connection is not valid if a fixed connection rule is not available for the connection, the medium at the end-points is not compatible, and a converter is not available to bridge the gap between the incompatible media. It also indicates the connection is not valid id the connection is listed in a compatibility issues table and no resolution code is listed which can be executed.

Figure 31:
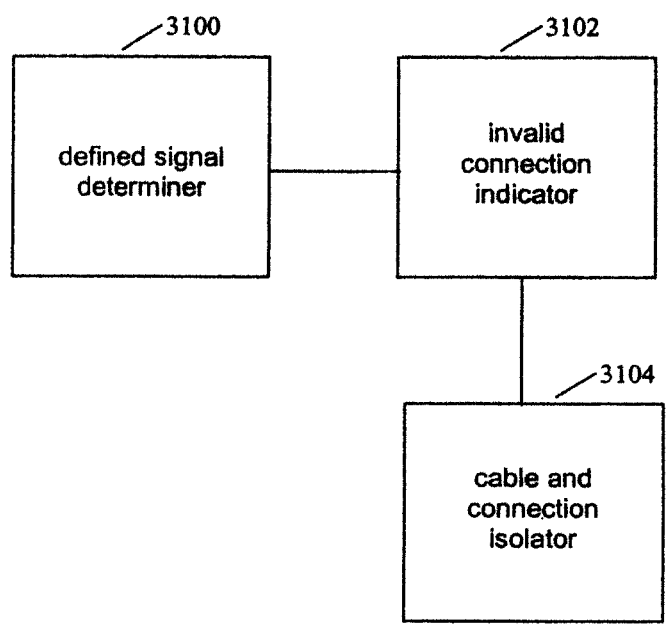
FIG. 31 is an block diagram illustrating and apparatus for adding a connection between pieces of equipment in a design of an equipment-based system where one of the pieces of equipment is passive, the pieces of equipment each having a model, in accordance with a specific embodiment of the present invention.

FIG. 31 is an block diagram illustrating and apparatus for adding a connection between pieces of equipment in a design of an equipment-based system where one of the pieces of equipment is passive, the pieces of equipment each having a model, in accordance with a specific embodiment of the present invention. A defined signal determiner 3100 determines if signals are defined for any passive ports in the pieces of equipment. An invalid connection indicator 3102 coupled to the defined signal determiner 3100 indicates that the connection is not valid if the signals are defined for any passive ports and signals at the connection endpoints are incompatible. A cable and connection isolator 3104 coupled to the invalid connection indicator 3102 isolates all cables with a common cable type specified at the connection endpoints. The invalid connection indicator 3102 may then indicate that the connection is not valid if no matching cables are found. Then the cable and connection isolator 3104 isolates all cables and connectors that mate with the connectors specified at the connection endpoints. The invalid connection indicator 3102 may then indicate that the connection is not valid if no matching cables with connectors are found or if the connection is listed in the compatibility issues and no executable resolution code is listed.

Figure 32:
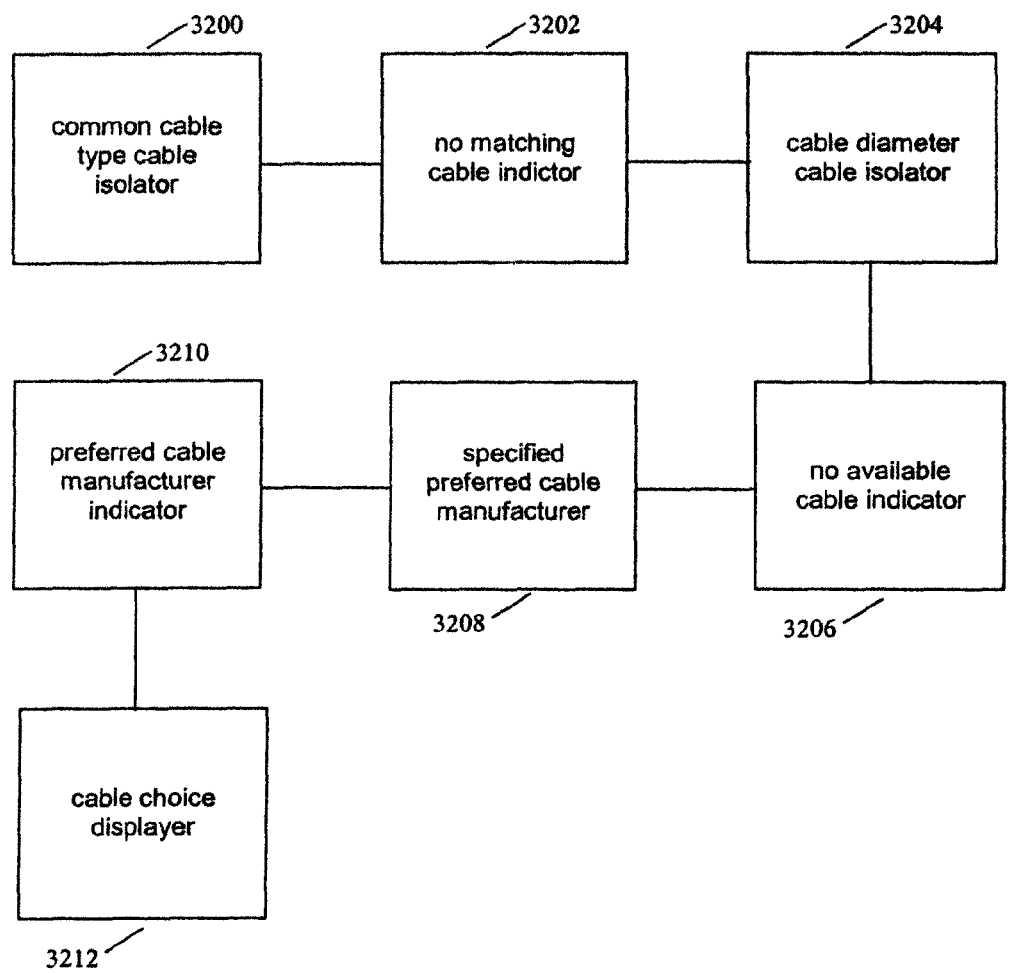
FIG. 32 is a block diagram illustrating an apparatus for selecting a cable to connect two or more pieces of equipment in a design of an equipment-based system, in accordance with a specific embodiment of the present invention.

FIG. 32 is a block diagram illustrating an apparatus for selecting a cable to connect two or more pieces of equipment in a design of an equipment-based system, in accordance with a specific embodiment of the present invention. A common cable type cable isolator 3200 isolates all cables of a common cable type specified at each of the pieces of equipment. A no matching cable indicator 3202 coupled to the common cable type cable isolator 3200 indicates no cable is available if no cables match the common cable type. The common cable type cable isolator 3200 may then isolate all cables with connectors that mate with ones specified at each of the pieces of equipment. The no matching cable indicator 3202 may then indicate no cable is available if no cables have connectors that mate with the ones specified at each of the pieces of equipment and no adapter is available for either piece of equipment.

A cable diameter cable isolator 3204 coupled to the no matching cable indicator 3202 isolates all cables with connectors that mate with ones specified at each of the pieces of equipment. A no available cable indicator 3206 coupled to the cable diameter cable isolator 3204 indicates no cable is available if no cables are available with diameters within the minimum and maximum value of the composite cabling specification.

A specified preferred cable manufacturer determiner 3208 coupled to the no available cable indicator 3206 determines if a preferred cable manufacturer is specified. A preferred cable manufacturer cable isolator 3210 coupled to the specified preferred cable manufacturer determiner 3208 isolates all cables made by the preferred cable manufacturer if one is specified. A cable choice displayer 3212 coupled to the preferred cable manufacturer cable isolator 3210 displays all cable choices to a user for selection if more than one cable is still available.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method for extracting part price information for a selected product configuration from a configuration tree encoded with a smart part number, the smart part number including a plurality of configuration codes representing the part price information embedded therein, the method comprising:
by a computer, for each configuration code,
determining that it is a valid configuration code; and
defining a branch of the configuration tree corresponding with the valid configuration code;
for each branch of the configuration tree, configuring at least one configuration point with a corresponding valid configuration code, the valid configuration code for the configuration point representing all valid configuration choices and prices associated with the corresponding configuration point, wherein the configuring at least one configuration point includes encoding a character string representing the branch with a first code delimiter and encoding each corresponding valid configuration code into the character string at a location associated with the configuration point and separating the corresponding valid configuration codes with a second delimiter; and
for the selected product configuration, summing the prices of the corresponding configuration points on the corresponding branch to determine a final price for the selected product configuration.

2. A computer implemented method for extracting part price information for a selected product configuration from a configuration tree encoded with a smart part number, the smart part number including a plurality of configuration codes representing the part price information embedded therein, the method comprising:
by a computer, for each configuration code,
determining that it is a valid configuration code; and
defining a branch of the configuration tree corresponding with the valid configuration code;
for each branch of the configuration tree, configuring at least one configuration point with a corresponding valid configuration code, the valid configuration code for the configuration point representing all valid configuration choices associated with the corresponding configuration point, wherein the configuring at least one configuration point includes encoding a character string representing the branch with a first code delimiter and encoding each corresponding valid configuration code into the character string at a location associated with the configuration point and separating the corresponding valid configuration codes with a second delimiter;
determining and configuring a product configuration price associated with each branch; and
for the selected product configuration, extracting the configured product configuration price to determine a final price for the selected product configuration.

3. An apparatus for extracting part price information for a selected product configuration from a configuration tree encoded with a smart part number, the smart part number including a plurality of configuration codes representing the part price information embedded therein, the apparatus comprising:
  a memory; and
  one or more processors configured to:
    for each configuration code,
      determine that it is a valid configuration code; and
      define a branch of the configuration tree corresponding with the valid configuration code;
    for each branch of the configuration tree, configure at least one configuration point with a corresponding valid configuration code, the valid configuration code for the configuration point representing all valid configuration choices and prices associated with the corresponding configuration point, wherein the configuring at least one configuration point includes encoding a character string representing the branch with a first code delimiter and encoding each corresponding valid configuration code into the character string at a location associated with the configuration point and separating the corresponding valid configuration codes with a second delimiter; and
    for the selected product configuration, sum the prices of the corresponding configuration points on the corresponding branch to determine a final price for the selected product configuration.

4. An apparatus for extracting part price information for a selected product configuration from a configuration tree encoded with a smart part number, the smart part number including a plurality of configuration codes representing the part price information embedded therein, the apparatus comprising:
  a memory; and
  one or more processors configured to:
    for each configuration code,
      determine that it is a valid configuration code; and
      define a branch of the configuration tree corresponding with the valid configuration code;
    for each branch of the configuration tree, configure at least one configuration point with a corresponding valid configuration code, the valid configuration code for the configuration point representing all valid configuration choices associated with the corresponding configuration point, wherein the configuring at least one configuration point includes encoding a character string representing the branch with a first code delimiter and encoding each corresponding valid configuration code into the character string at a location associated with the configuration point and separating the corresponding valid configuration codes with a second delimiter;
    determine and configure a product configuration price associated with each branch; and
    for the selected product configuration, extract the configured product configuration price to determine a final price for the selected product configuration.

5. An apparatus for extracting part price information for a selected product configuration from a configuration tree encoded with a smart part number, the smart part number including a plurality of configuration codes representing the part price information embedded therein, the apparatus comprising:
  means for, for each configuration code,
    determining that it is a valid configuration code; and
    defining a branch of the configuration tree corresponding with the valid configuration code;
  means for, for each branch of the configuration tree, configuring at least one configuration point with a corresponding valid configuration code, the valid configuration code for the configuration point representing all valid configuration choices and prices associated with the corresponding configuration point, wherein the configuring at least one configuration point includes encoding a character string representing the branch with a first code delimiter and encoding each corresponding valid configuration code into the character string at a location associated with the configuration point and separating the corresponding valid configuration codes with a second delimiter; and
  means for, for the selected product configuration, summing the prices of the corresponding configuration points on the corresponding branch to determine a final price for the selected product configuration.

6. An apparatus for extracting part price information for a selected product configuration from a configuration tree encoded with a smart part number, the smart part number including a plurality of configuration codes representing the part price information embedded therein, the apparatus comprising:
  means for, for each configuration code,
    determining that it is a valid configuration code; and
    defining a branch of the configuration tree corresponding with a valid configuration code;
  means for, for each branch of the configuration tree, configuring at least one configuration point with the corresponding valid configuration code, the valid configuration code for the configuration point representing all valid configuration choices associated with the corresponding configuration point, wherein the configuring at least one configuration point includes encoding a character string representing the branch with a first code delimiter and encoding each corresponding valid configuration code into the character string at a location associated with the configuration point and separating the corresponding valid configuration codes with a second delimiter;
  means for determining and configuring a product configuration price associated with each branch; and
  means for, for the selected product configuration, extracting the configured product configuration price to determine a final price for the selected product configuration.

* * * * *